(12) United States Patent
Fujishima et al.

(10) Patent No.: US 6,782,644 B2
(45) Date of Patent: Aug. 31, 2004

(54) REMOTE CONTROL SYSTEM AND REMOTE SETTING SYSTEM FOR CONSTRUCTION MACHINERY

(75) Inventors: Kazuo Fujishima, Niihari-gun (JP); Tooru Kurenuma, Tsuchiura (JP); Hiroshi Ogura, Ryuugasaki (JP); Hideto Ishibashi, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/343,414

(22) PCT Filed: May 17, 2002

(86) PCT No.: PCT/JP02/04783
§ 371 (c)(1),
(2), (4) Date: Jan. 30, 2003

(87) PCT Pub. No.: WO03/000997
PCT Pub. Date: Jan. 3, 2003

(65) Prior Publication Data
US 2003/0147727 A1 Aug. 7, 2003

(30) Foreign Application Priority Data
Jun. 20, 2001 (JP) .................... 2001-186278

(51) Int. Cl.[7] .............. E02F 5/02; G02D 1/04
(52) U.S. Cl. ............ 37/348; 340/679; 340/686.1; 701/50
(58) Field of Search .......... 37/348, 414, 466, 37/902; 701/50; 340/679, 686.1; 172/2, 4.5

(56) References Cited
U.S. PATENT DOCUMENTS 4,829,418 A * 5/1989 Nielsen et al. ............ 700/59
4,888,890 A * 12/1989 Studebaker et al. ........ 37/348

(List continued on next page.)

FOREIGN PATENT DOCUMENTS

| JP | 58-26130 | 2/1983 |
|---|---|---|
| JP | 3-295933 | 12/1991 |
| JP | 6-80251 | 10/1994 |
| JP | 2628004 | 4/1997 |
| JP | 9-115001 | 5/1997 |
| JP | 10-18353 | 1/1998 |
| JP | 11-132071 | 5/1999 |
| JP | 2000-204580 | 7/2000 |
| JP | 2001-98585 | 4/2001 |
| JP | 2001-123476 | 5/2001 |
| JP | 2001-159518 | 6/2001 |
| WO | WO95/30059 | 11/1995 |
| WO | WO99/22079 | 5/1999 |
| WO | WO01/25549 | 4/2001 |

Primary Examiner—Thomas B. Will
Assistant Examiner—Thomas A. Beach
(74) Attorney, Agent, or Firm—Mattingly, Stanger & Malur, P.C.

(57) ABSTRACT

A hydraulic excavator 1 has an area limiting excavation control function for controlling operation of a front working device so as to form a target work plane. A remote control terminal 102 for wirelessly maneuvering the hydraulic excavator 1 is provided in a management office so that entry of setting information of a target excavation plane and remote maneuvering can be performed from the side of the remote control terminal 102. A display unit 71b for displaying a positional relationship between the hydraulic excavator 1 and the target excavation plane is further provided in the remote control terminal. An operator can remotely set the target excavation plane while looking at a screen of the display unit 71b, and also form the target excavation plane by remotely maneuvering the front working device 7 using a joystick 72 with the aid of a control function of an area limiting excavation controller. As a result, the remote setting of the target excavation plane and the remote maneuvering of the hydraulic excavator 1 can be easily performed.

20 Claims, 27 Drawing Sheets

U.S. PATENT DOCUMENTS

| | | | | |
|---|---|---|---|---|
| 5,019,761 A | * | 5/1991 | Kraft | 318/568.11 |
| 5,100,229 A | * | 3/1992 | Lundberg et al. | 356/3.12 |
| 5,551,524 A | * | 9/1996 | Yamamoto et al. | 180/6.62 |
| 5,666,792 A | * | 9/1997 | Mullins | 56/10.2 A |
| 6,044,316 A | * | 3/2000 | Mullins | 701/50 |
| 6,112,139 A | * | 8/2000 | Schubert et al. | 701/2 |
| 6,374,147 B1 | * | 4/2002 | Rockwood | 700/69 |
| 6,449,884 B1 | * | 9/2002 | Watanabe et al. | 37/348 |
| 6,532,409 B1 | * | 3/2003 | Fujishima et al. | 701/50 |
| 6,614,361 B1 | * | 9/2003 | Kinugawa | 340/870.16 |
| 6,691,435 B1 | * | 2/2004 | Schultz et al. | 37/234 |
| 2003/0036817 A1 | * | 2/2003 | Morley et al. | 700/245 |

* cited by examiner

FIG.8
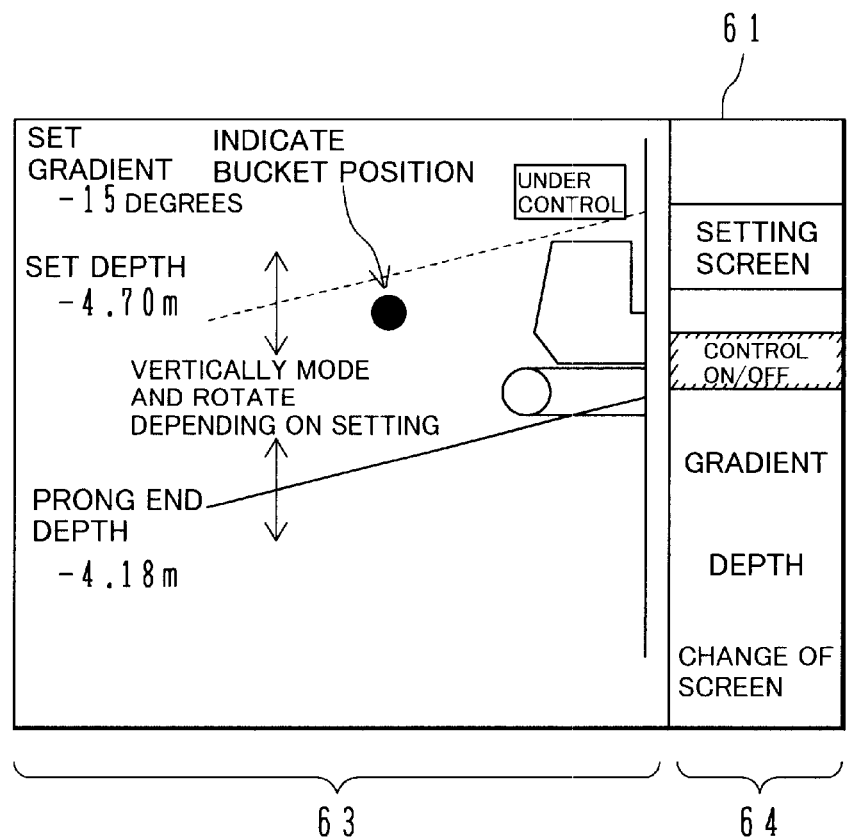
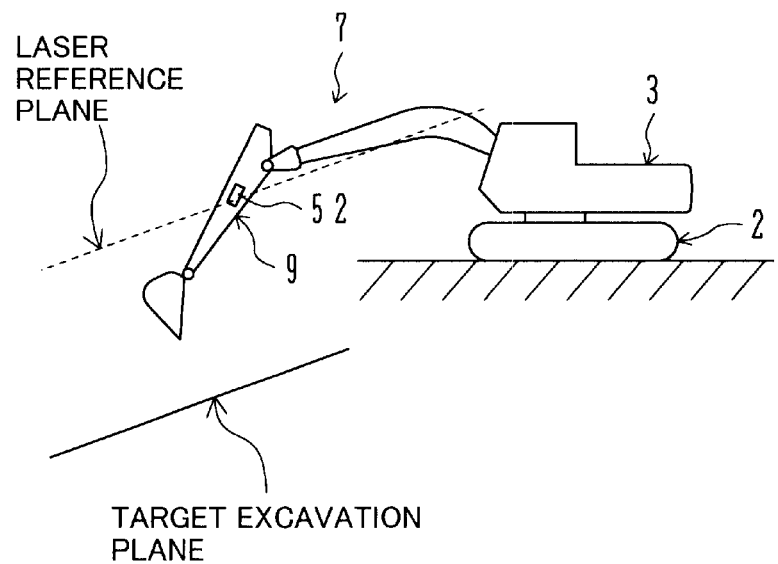

FIG.9
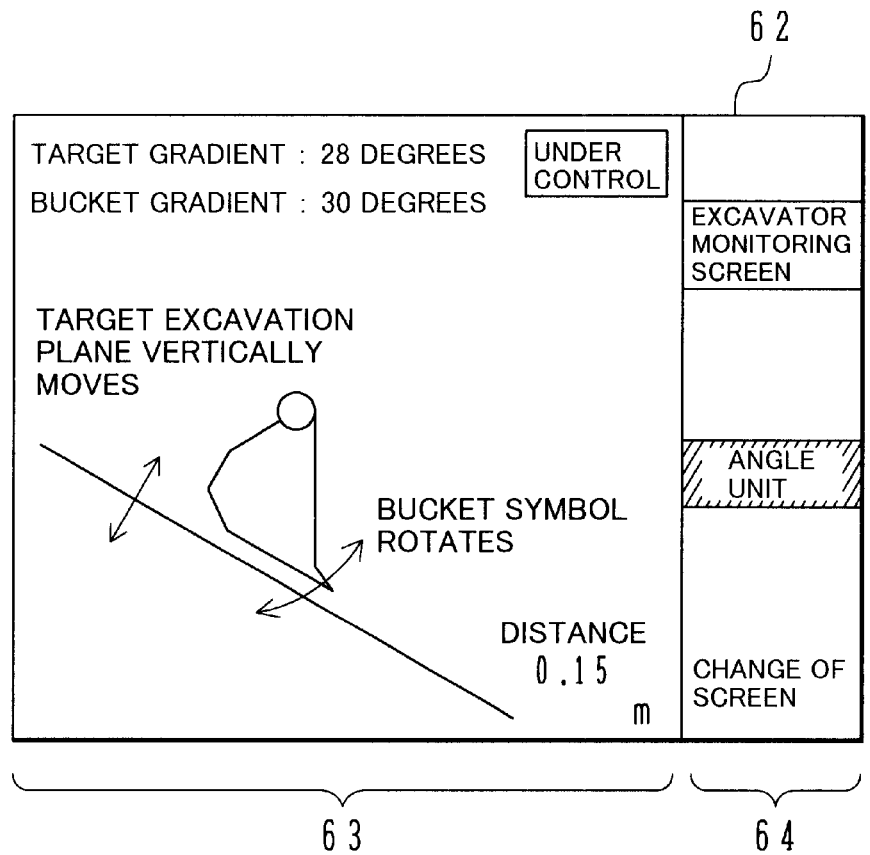
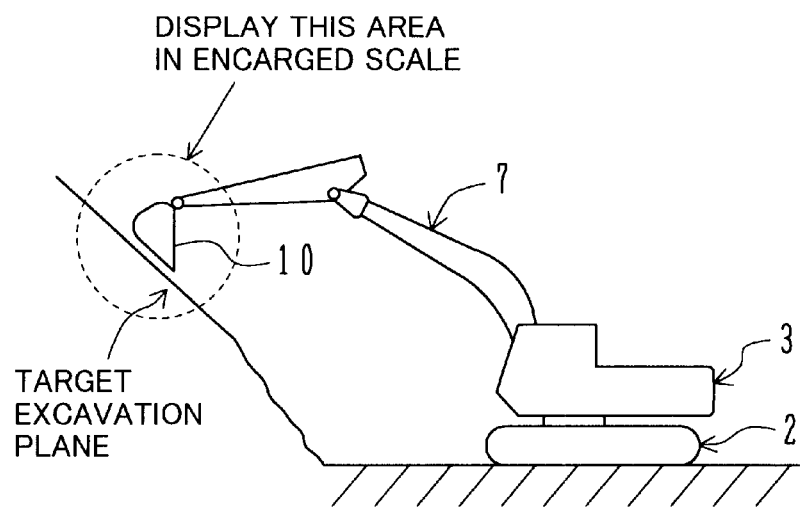

FIG.10
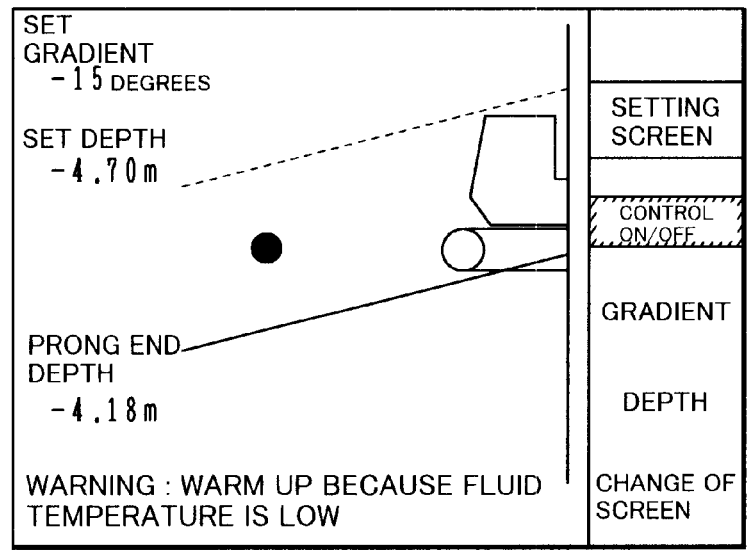
CHANGE OF SCREEN SELECT & DECIDE ↑↓ CHANGE OF SCREEN SELECT & DECIDE
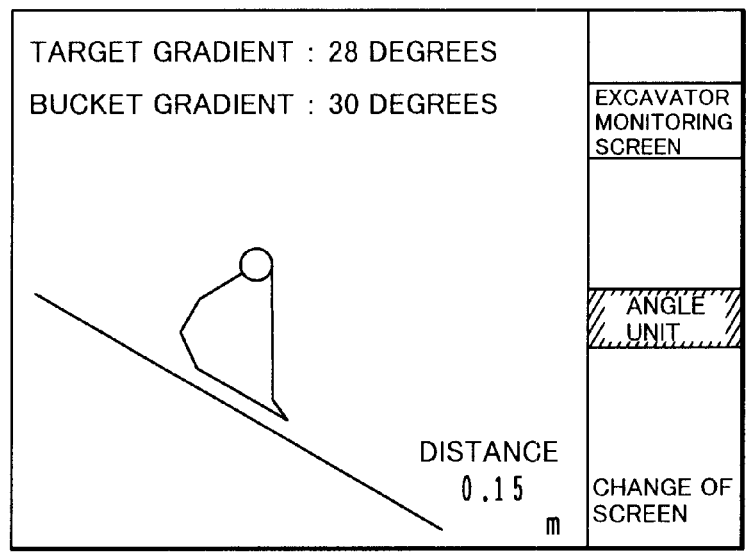

REMOTE CONTROL SYSTEM AND REMOTE SETTING SYSTEM FOR CONSTRUCTION MACHINERY

TECHNICAL FIELD

The present invention relates to a remote control system and a remote setting system for a construction machine having a multi-articulated front working device, such as a hydraulic excavator. More particularly, the present invention relates to a remote control system and a remote setting system for a construction machine equipped with means for performing front control, e.g., area limiting excavation control for controlling the operation of a front working device based on setting information of a target work plane so as to form the target work plane.

BACKGROUND ART

A hydraulic excavator is a typical example of construction machines. In a hydraulic excavator, front members, such as a boom and an arm, constituting a front working device are operated by respective manual control levers and are coupled to each other through articulations for rotation. It is therefore very difficult work to perform excavation in a predetermined area, particularly in a linearly set area, by operating the front members. A system for automating such work is proposed, for example, in PCT Laid-Open Publication WO95/30059. According to this proposal, an excavation enable area is set on the basis of a machine body. Then, when a part of the front working device, e.g., a bucket, approaches a boundary of the excavation enable area, a motion of the bucket only in a direction toward the boundary is decelerated. When the bucket reaches the boundary of the excavation enable area, the bucket is caused to move along the boundary of the excavation enable area while it is prevented from going out of the excavation enable area.

In the case of performing that type of work in an automatic manner, as the machine body moves, the posture and height of the hydraulic excavator itself are changed with change in topography of the work site. The area set on the basis of the machine body must be set again whenever the machine body moves. Therefore, proposals for overcoming that disadvantage are proposed in JP,A 3-295933 and JP,A 2000-204580. According to those proposals, the height of a machine body is detected by a sensor provided on the machine body using a laser beam emitted from a laser oscillator that is installed on the surface of ground to be excavated. An excavation depth (corresponding to the limited area in the above-described proposal) is decided based on the detected height of the machine body, and excavation is linearly performed for a predetermined length in a state in which the machine body is stopped. Then, the machine body is traveled by a predetermined distance, and excavation is linearly performed again after stopping the machine body there. On that occasion, a change in the height of the machine body is detected using the laser beam, and the excavation depth is corrected depending on the detected height change.

Further, PCT Laid-Open Publication W001/25549 discloses a setting device for enabling a target excavation area to be easily set using an external reference, such as a laser beam, in the automatic excavation control. The setting device comprises a control unit and a display unit both equipped in a machine body. The display unit displays the positional relationship among the machine body, the external reference and the target excavation area so that an operator can set the target excavation area based on the positional relationship with respect to the external reference while looking at a screen of the display unit.

Meanwhile, another prior art regarding remote control of a construction machine, such as a hydraulic excavator, is disclosed in Japanese Patent No. 2628004 and JP,A No. 58-26130. According to Japanese Patent No. 2628004, an operating state of the hydraulic excavator is picked up by a monitoring camera, and a picked-up image is displayed on an associated monitoring TV of a computer installed in a site office. Design lines for a ditch and a face of slope are displayed on the camera image in a superimposed manner. An operator can remotely operate the hydraulic excavator for excavation while looking at the displayed image. JP,A No. 58-26130 discloses a technique for detecting the position of a construction machine through exchange of information on the basis of a reference point and operating the construction machine in a full automatic manner. With that technique, a control program for the automatic operation is stored on the side of a remotely installed computer, and when the automatic operation is started, command signals according to the control program are wirelessly transmitted to the construction machine, and the computer wirelessly receives information detected by various sensors from the construction machine. The control program includes a work specification program that is modified depending on each work site and each district.

DISCLOSURE OF THE INVENTION

In the field of construction machines, there has recently been a strong demand for remote maneuvering. This is because, in works for restoring, e.g., a disaster region, a remotely maneuverable construction machine must be employed to remove earth and sand and to form a mudflow dam in not a few cases from the viewpoint of safety. When carrying out such works, it is required not only to determine the place where the construction machine is now present, but also to make a plan designating the position and extent at which excavation is to be performed. The works have been conventionally performed while monitoring a construction machine under work with, e.g., a camera from a remote location, or while confirming the excavation position with the aid of an image picked up by a camera or the like mounted on the construction machine. However, since the disaster region, including roads, is mostly buried with earth and sand, it has been difficult to precisely specify the excavation position. Further, because of remotely maneuvering the construction machine, the operator is required to have a skill particularly in the works of leveling and slope face forming, and because of performing the works while looking at a camera image, the working efficiency is reduced.

In any of the techniques disclosed in WO95/30059, JP,A 3-295933, JP,A 2000-204580, and W001/25549, since the construction machine is operated by the operator riding on the machine, it has been impossible to maneuver the construction machine through the remote control and to set the target excavation plane through the remote control.

With the technique disclosed in Japanese Patent No. 2628004, design lines for a ditch and a face of slope are displayed on a camera image of the work site in a superimposed manner so that the operator can remotely perform the excavation work while looking at the displayed image. However, because the hydraulic excavator is manually operated, there have been problems that the operator must perform the work with close attention so as to realize the excavation as per the design lines, and an increased burden is imposed on the operator.

With the technique disclosed in JP,A No. 58-26130, no burden is imposed on the operator because of full-automation control. However, the full-automation control causes a difficulty in adapting for various work sites in a precise and rapid manner, and in bringing that technique into practical use.

Moreover, with attention focused on CALS (Continuous Acquisition & Lifecycle Support) systems in the field of construction, there has been a recent trend toward management of working drawings in the form of electronic data and applications to control of a machine body based on the electronic data. More specifically, the position of the machine body in the work site is measured and the machine body is automatically controlled while referring to the working drawings stored in the machine body. In general, though depending on different work sites, working data is given as digital data too much as to store it in the machine body, and working data storable in the machine body is just a few part of the whole data in most cases. When performing such control, therefore, the working data must be frequently stored in the machine body. One conceivable means is to construct the machine body to be able to receive a storage medium, e.g., a CD-R, and to read the working data on demand for update. Such a solution, however, would require a device for driving a CD-R to be installed in the machine body and hence increases the machine cost. Further, that solution cannot be said as an effective method, taking into account that the driving device must tolerate against severe environments, such as shocks, temperature and humidity, to which construction machines are subjected.

A first object of the present invention is to provide a remote control system for a construction machine, which can easily perform remote setting of a target work plane and remote maneuvering of the construction machine in various work sites.

A second object of the present invention is to provide a remote control system and a remote setting system for a construction machine, which can easily perform remote setting of a target work plane using working data in the form of a very large amount of electronic data.

(1) To achieve the above first object, the present invention provides a remote control system for a construction machine comprising a plurality of driven members including a plurality of vertically rotatable front members which constitute a multi-articulated front working device, a plurality of hydraulic actuators for driving respectively the plurality of driven members, a plurality of hydraulic control valves for controlling flow rates of a hydraulic fluid supplied to the plurality of hydraulic actuators, and front control means for controlling the plurality of hydraulic control valves and controlling operation of the front working device so as to form a preset target work plane, wherein the system includes machine-side control means equipped in the construction machine and a remote control terminal for wirelessly maneuvering the construction machine; the remote control terminal comprises remote control means for outputting wireless maneuvering signals to instruct operations of the plurality of driven members, input means for inputting setting information of the target work plane, first wireless communicating means for transmitting the wireless maneuvering signals and the setting information to the construction machine, and display means for displaying a positional relationship between the construction machine and the target work plane; the machine-side control means includes second wireless communicating means for receiving the wireless maneuvering signals and the setting information from the remote control terminal; and the front control means controls the hydraulic control valves based on the wireless maneuvering signals and the setting information of the target work plane, thereby controlling the operation of the front working device so as to form the target work plane.

Thus, for the construction machine including the front control means for controlling the operation of the front working device so as to form the target work plane, the machine-side control means and the remote control terminal are provided so that entry of the setting information of the target excavation plane and remote maneuvering can be performed from the side of the remote control terminal. Further, the display means for displaying the positional relationship between the construction machine and the target work plane is provided in the remote control terminal. Therefore, an operator can remotely set the target excavation plane while looking at a screen of the display means, and also form the target work plane by remotely maneuvering the front working device with the aid of the control function of the front control means. As a result, the remote setting of the target work plane and the remote maneuvering of the construction machine can be easily performed.

Also, since the front control means is operated in a semiautomatic control manner in which the operation of the front working device is controlled based on the wireless maneuvering signals from the remote control means and the setting information, a burden imposed on the operator is much reduced in comparison with the case of manual control, and the system can be easily adapted for various work sites just by changing the setting information.

(2) In above (1), preferably, the input means of the remote control terminal is means for inputting the setting information correlated to an external reference for the construction machine, the display means is means for displaying the positional relationship between the construction machine and the target work plane in correlation to the external reference, one of the machine-side control means and the remote control terminal further includes setting information converting means for converting the setting information of the target work plane correlated to the external reference for the construction machine into the positional relationship between the construction machine and the target work plane, and the front control means controls the hydraulic control valves based on the wireless maneuvering signals and the setting information converted into the positional relationship between the construction machine and the target work plane, thereby controlling the operation of the front working device so as to form the target work plane.

Thus, entry of the setting information of the target work plane on the side of the remote control terminal is performed using data correlated to the external reference for the construction machine, and the setting information of the target work plane is converted into the positional relationship between the construction machine and the target work plane in one of the machine-side control means and the remote control terminal. Therefore, the operator can set the target work plane by employing the external reference. In addition, since the positional relationship between the construction machine and the target work plane is displayed in correlation to the external reference on the display means of the remote control terminal at the time of setting, the operator can easily set the target work plane while looking at the screen of the display means.

(3) In above (2), preferably, the external reference is a laser reference plane formed by a laser beam emitted from a laser beam stand, the input means is means for inputting, as the setting information, a positional relationship between the laser reference plane and the target work plane, and the setting information converting means comprises measuring means for measuring a positional relationship between the construction machine and the laser reference plane, and computing means for determining the positional relationship between the construction machine and the target work plane by using the positional relationship between the laser reference plane and the target work plane inputted through the input means and the positional relationship between the construction machine and the laser reference plane measured by the measuring means.

With that feature, the remote setting of the target work plane and the remote maneuvering of the construction machine can be easily performed by employing the laser reference plane as the external reference.

(4) In above (2), preferably, the display means of the remote control terminal operates in a switchable manner between a setting mode and a remote control mode, displays a positional relationship among the external reference, the target work plane and the construction machine when the setting mode is selected, and displays a positional relationship between the target work plane and the front working device when the remote control mode is selected.

With that feature, by switching over the mode of the display means to the remote control mode during the remote control, the operator can perform the remote maneuvering even during the remote control while looking at the screen of the display means, and operability during the remote control can be further improved.

(5) Also, to achieve the above second object, in the present invention according to above (2), the external reference is an external coordinate system set outside the construction machine and having a known position and posture, the input means is means for inputting, as the setting information, working data correlated to the external coordinate system, and the setting information converting means is means provided in the remote control terminal, creating setting information of the target work plane on the basis of the external coordinate system from the working data, and converting the created setting information into the setting information of the target work plane on the basis of a machine body coordinate system set on the construction machine.

With those features, the setting information of the target work plane on the basis of the machine body coordinate system, which is set on the construction machine, can be created using the working data correlated to the external coordinate system. Also, because of the input means and the setting information converting means both being provided in the remote control terminal, even though the working data is given as a very large amount of electronic data, it is no longer necessary to store the working data in the machine-side control means, whereas the operator can easily perform the remote setting of the target work plane and the remote maneuvering of the construction machine by utilizing the working data in the form of a very large amount of electronic data.

(6) In above (5), preferably, the external coordinate system is an orthogonal coordinate system having the origin set to the center of an ellipsoid representing the globe.

With that feature, the working data created using information of the latitude, longitude and height of the globe can be utilized as working data correlated to the external coordinate system (orthogonal coordinate system having the origin set to the center of the ellipsoid representing the globe). Therefore, the remote setting of the target work plane and the remote maneuvering of the construction machine can be easily performed by utilizing the working data created using the information of the latitude, longitude and height of the globe.

(7) In above (5), preferably, the setting information converting means comprises machine-body coordinate measuring and computing means for determining the position and posture of the machine body coordinate system as values on the external coordinate system, and setting information computing means for converting the setting information of the target work plane on the basis of the external coordinate system into the setting information of the target work plane on the basis of the machine body coordinate system by using the position and posture of the machine body coordinate system on the basis of the external coordinate system determined by the machine-body coordinate measuring and computing means.

With that feature, regardless of movement of the construction machine, the setting information of the target work plane on the basis of the machine body coordinate system can be created by determining the position and posture of the machine body coordinate system as values on the external coordinate system, thereby specifying the position and posture of the construction machine on the basis of the external coordinate system, whenever the construction machine moves.

(8) In above (7), preferably, the setting information converting means further comprises means for comparing the position and posture of the machine body coordinate system on the basis of the external coordinate system with the working data, extracting a part of the working data with respect to the position and posture of the machine body coordinate system, and creating the setting information of the target work plane on the basis of the external coordinate system from the part of the working data.

With that feature, the setting information of the target work plane on the basis of the external coordinate system can be created by extracting only a necessary part of the working data given as a very large amount of electronic data.

(9) In above (7), preferably, the machine-body coordinate measuring and computing means comprises at least two GPS receiving means installed on the construction machine at different positions, and coordinate position computing means for determining the position and posture of the machine body coordinate system, as values on the external coordinate system, based on information received by the two GPS receiving means.

With that feature, the setting information of the target work plane on the basis of the machine body coordinate system can be created by determining the position and posture of the machine body coordinate system, as values on the external coordinate system (global coordinate system), using the at least two GPS receiving means.

(10) In above (9), preferably, the machine-body coordinate measuring and computing means further comprises inclination measuring means for measuring an inclination of the construction machine, and the coordinate position computing means determines the position and posture of the machine body coordinate system, as values on the external coordinate system, based on information received by the two GPS receiving means and a result measured by the inclination measuring means.

With those features, even when the construction machine is inclined, the position and posture of the machine body coordinate system can be determined as values on the external coordinate system with high accuracy.

(11) In above (9), preferably, the construction machine comprises a lower travel structure and an upper swing structure mounted on the lower travel structure in a swingable manner with the front working device being mounted to the upper swing structure in a vertically rotatable manner, the two GPS receiving means have two GPS antennas installed on the upper swing structure at different positions, the machine body coordinate system is an orthogonal coordinate system fixedly set on the lower travel structure at a position near a rotation axis of the upper swing structure, the machine-body coordinate measuring and computing means further comprises angle measuring means for measuring a rotational angle of the upper swing structure relative to the lower travel structure, and the coordinate position computing means determines the position and posture of the machine body coordinate system, as values on the external coordinate system, based on the information received by the two GPS receiving means and a result measured by the angle measuring means.

With those features, even when the GPS receiving means are installed on the upper swing structure, it is possible to determine, as values on the external coordinate system, the position and posture of the machine body coordinate system fixedly set on the lower travel structure.

(12) In above (7), preferably, the machine-body coordinate measuring and computing means comprises three-dimensional position measuring means installed at a particular position on a ground, which has a known positional relationship relative to the external coordinate system, and measuring a distance and azimuth of the particular position on the ground relative to a particular position on the construction machine, a laser beam receiver installed on the construction machine, a laser beam stand for emitting a laser beam toward the laser beam receiver, and coordinate position computing means for computing a positional relationship between the particular position on the ground and the laser beam upon a trigger issued when the laser beam receiver receives the laser beam emitted from the laser beam stand, and determining the position and posture of the machine body coordinate system with respect to the particular position on the ground based on a thus-computed result and a result measured by the three-dimensional position measuring means.

With that feature, it is possible, without directly employing the GPS, to determine the position and posture of the machine body coordinate system, as values on the external coordinate system (global coordinate system), and to create the setting information of the target work plane on the basis of the machine body coordinate system.

Also, because of that the position and posture of the machine body coordinate system can be determined as values on the external coordinate system (global coordinate system) without directly employing the GPS, even when the construction machine is in the work site such as the underground, the interior of buildings and mountain regions, where it is impossible to catch GPS satellites, or even when the work site is under weather conditions where it is impossible to receive electric waves from the satellites with the GPS, the position and posture of the machine body coordinate system can be determined as values on the external coordinate system (global coordinate system) without being affected by the conditions of the work site.

(13) In above (12), preferably, the machine-body coordinate measuring and computing means further comprises inclination measuring means for measuring an inclination of the construction machine, and the coordinate position computing means determines the position and posture of the machine body coordinate system with respect to the particular position on the ground based on the result of computing the positional relationship between the particular position on the ground and the laser beam, the result measured by the three-dimensional position measuring means, and a result measured by the inclination measuring means.

With those features, even when the construction machine is inclined, the position and posture of the machine body coordinate system can be determined as values on the external coordinate system with high accuracy without directly employing the GPS.

(14) In above (12), preferably, the construction machine comprises a lower travel structure and an upper swing structure mounted on the lower travel structure in a swingable manner with the front working device being mounted to the upper swing structure in a vertically rotatable manner, the particular position of the construction machine, at which the machine body coordinate system is set, is located near a rotation axis of the upper swing structure, the machine body coordinate system is an orthogonal coordinate system fixedly set on the lower travel structure, the machine-body coordinate measuring and computing means further comprises angle measuring means for measuring a rotational angle of the upper swing structure relative to the lower travel structure, and the coordinate position computing means determines the position and posture of the machine body coordinate system with respect to the particular position on the ground based on the result of computing the positional relationship between the particular position on the ground and the laser beam, the result measured by the three-dimensional position measuring means, and a result measured by the angle measuring means.

With those features, even when the GPS receiving means is installed on the upper swing structure, the position and posture of the machine body coordinate system fixedly set on the lower travel structure can be determined as values on the external coordinate system without directly employing the GPS.

(15) In above (14), preferably, the laser beam receiver is provided on the front working device, the machine-body coordinate measuring and computing means further comprises position/posture measuring means for measuring positions and postures of the plurality of front members constituting the front working device, and the coordinate position computing means determines the position and posture of the machine body coordinate system with respect to the particular position on the ground based on the result of computing the positional relationship between the particular position on the ground and the laser beam, the result measured by the three-dimensional position measuring means, the result measured by the angle measuring means, and a result measured by the position/posture measuring means.

With those features, even when the multi-articulated front working machine is mounted to the upper swing structure in a vertically rotatable manner and the laser beam receiver is provided on the front working device, the position and posture of the machine body coordinate system fixedly set on the lower travel structure can be determined as values on the external coordinate system.

(16) In above (12), preferably, the three-dimensional position measuring means is a laser tracking device for tracking a reflector installed at the particular position of the construction machine and measuring a distance to and azimuth of the reflector.

With that feature, the three-dimensional position measuring means can be constituted using an existing system that is known as an automatic tracking total station system.

(17) Further, to achieve the above second object, the present invention provides a remote setting system for a construction machine comprising a plurality of driven members including a plurality of vertically rotatable front members which constitute a multi-articulated front working device, a plurality of hydraulic actuators for driving respectively the plurality of driven members, a plurality of hydraulic control valves for controlling flow rates of a hydraulic fluid supplied to the plurality of hydraulic actuators, and front control means for controlling the plurality of hydraulic control valves and controlling operation of the front working device so as to form a preset target work plane, wherein the system includes machine-side control means equipped in the construction machine and a remote control terminal; the remote control terminal comprises input means for inputting working data correlated to an external coordinate system that is set outside the construction machine and has a known position and posture, setting information converting means for creating setting information of the target work plane on the basis of the external coordinate system from the working data, and converting the created setting information into setting information of the target work plane on the basis of a machine body coordinate system set on the construction machine, first wireless communicating means for transmitting the setting information of the target work plane on the basis of the machine body coordinate system to the construction machine, and display means for displaying a positional relationship between the construction machine and the target work plane in correlation to the external coordinate system; the machine-side control means includes second wireless communicating means for receiving the setting information of the target work plane on the basis of the machine body coordinate system from the remote control terminal; and the front control means controls the hydraulic control valves based on the setting information of the target work plane on the basis of the machine body coordinate system, thereby controlling the operation of the front working device so as to form the target work plane.

With those features, the setting information of the target work plane on the basis of the machine body coordinate system, which is set on the construction machine, can be created using the working data correlated to the external coordinate system. Also, because of the input means and the setting information converting means both being provided in the remote control terminal, even though the working data is given as a very large amount of electronic data, it is no longer necessary to store the working data in the machine-side control means, whereas the operator can easily perform the remote setting of the target work plane by utilizing the working data in the form of a very large amount of electronic data.

(18) In above (17), preferably, the external coordinate system is an orthogonal coordinate system having the origin set to the center of an ellipsoid representing the globe.

With that feature, the working data created using information of the latitude, longitude and height of the globe can be utilized as working data correlated to the external coordinate system (orthogonal coordinate system having the origin set to the center of the ellipsoid representing the globe). Therefore, the remote setting of the target work plane can be easily performed by utilizing the working data created using the information of the latitude, longitude and height of the globe.

(19) In above (17), preferably, the setting information converting means comprises machine-body coordinate measuring and computing means for determining a position and posture of the machine body coordinate system as values on the external coordinate system, and setting information computing means for converting the setting information of the target work plane on the basis of the external coordinate system into the setting information of the target work plane on the basis of the machine body coordinate system by using the position and posture of the machine body coordinate system on the basis of the external coordinate system determined by the machine-body coordinate measuring and computing means.

With that feature, regardless of movement of the construction machine, the setting information of the target work plane on the basis of the machine body coordinate system can be created by determining the position and posture of the machine body coordinate system as values on the external coordinate system, thereby specifying the position and posture of the construction machine on the basis of the external coordinate system, whenever the construction machine moves.

(20) In above (19), preferably, the setting information converting means further comprises means for comparing the position and posture of the machine body coordinate system on the basis of the external coordinate system with the working data, extracting a part of the working data with respect to the position and posture of the machine body coordinate system, and creating the setting information of the target work plane on the basis of the external coordinate system from the part of the working data.

With that feature, the setting information of the target work plane on the basis of the external coordinate system can be created by extracting only a necessary part of the working data given as a very large amount of electronic data.

BRIEF DESCRIPTION OF THE DRAWINGS

FIG. 8 shows, on an upper side, an excavation setting screen displayed on a display unit of the personal computer and, on a lower side, an illustration for explaining the contents of the displayed screen.

FIG. 9 shows, on an upper side, an excavation monitoring screen displayed on the display unit and, on a lower side, an illustration for explaining the contents of the displayed screen.

FIG. 10 shows a transition of screens displayed on the display unit.

BEST MODE FOR CARRYING OUT THE INVENTION

Embodiments of the present invention will be described below with reference to the drawings.

Figure 1:
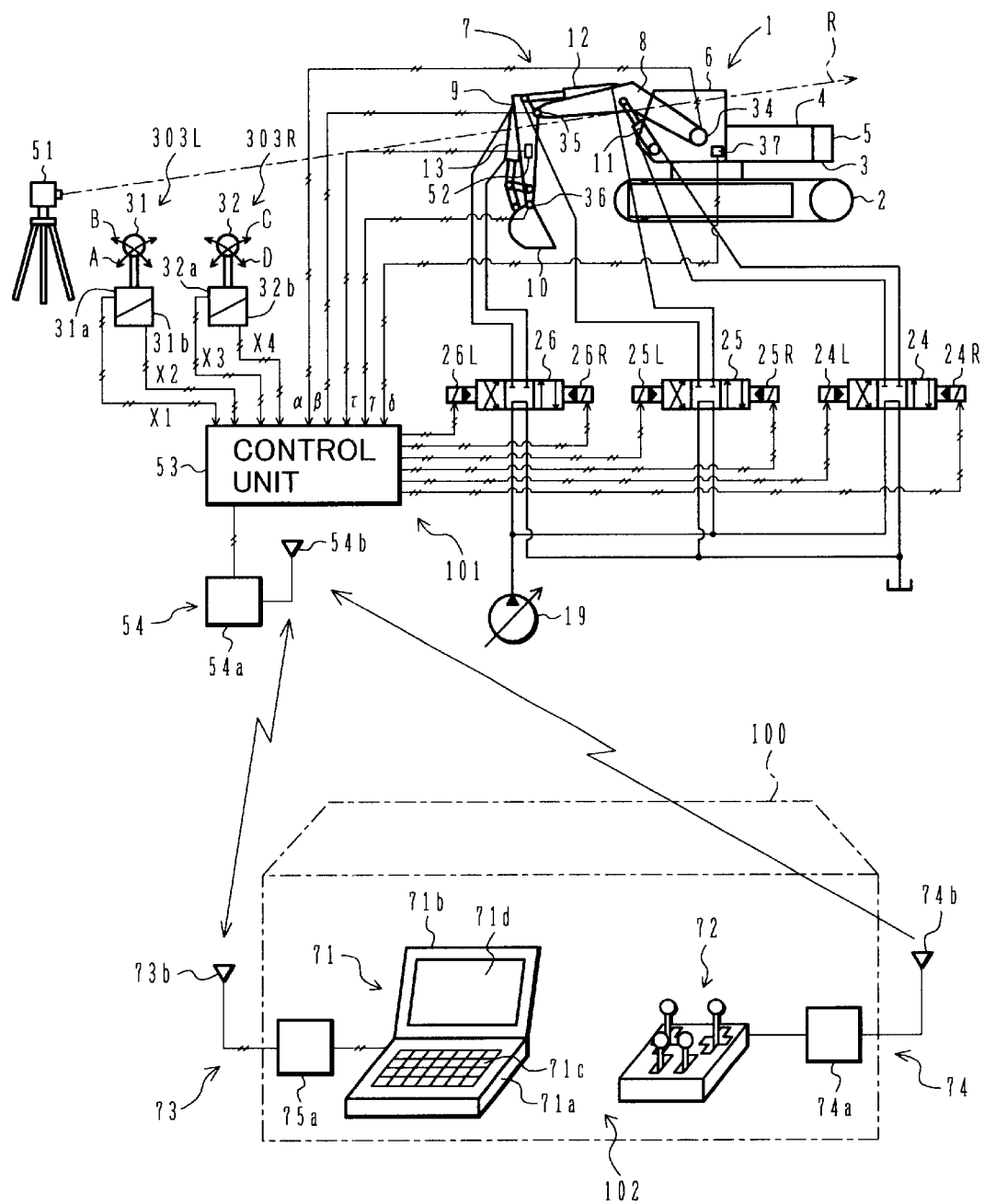
FIG. 1 shows an overall configuration of a remote control system for a construction machine according to one embodiment of the present invention.

FIG. 1 shows an overall configuration of a remote control system for a construction machine according to a first embodiment of the present invention.

Referring to FIG. 1, numeral 1 denotes a hydraulic excavator, and 100 denotes a management office installed in a place remote from the hydraulic excavator 1.

The hydraulic excavator 1 comprises a lower travel structure 2, an upper swing structure 3, and a front working device 7. The upper swing structure 3 is mounted to the lower travel structure in a swingable manner, and the front working device 7 is mounted to a front portion of the upper swing structure 3 in a vertically rotatable manner. The upper swing structure 3 comprises an accommodation room 4, a counterweight 5, a cab 6, and so on. The front working device 7 is of a multi-articulated structure having a boom 8, an arm 9 and a bucket 10. The boom 8, the arm 9 and the bucket 10 are driven respectively by a boom cylinder 11, an arm cylinder 12 and a bucket cylinder 13 for rotation. The lower travel structure 2 is driven by left and right travel motors (not shown) for traveling, and the upper swing structure 3 is driven by a swing motor (not shown) for a swing motion.

The boom cylinder 11, the arm cylinder 12 and the bucket cylinder 13 are connected to a hydraulic pump 19 through control valves 24, 25 and 26, respectively. Flow rates and directions of a hydraulic fluid supplied from the hydraulic pump 19 to the respective cylinders 11, 12 and 13 are adjusted with the flow control valves 24, 25 and 26. Though omitted here for the brevity of drawings, left and right travel control valves and a swing control valve are also provided respectively for the left and right travel motors and the swing motor.

Control lever devices 303L, 303R are provided in association with the control valves 24, 25 and 26 and the swing control valve. The control lever devices 303L, 303R comprise respectively control levers 31, 32 and potentiometers 31a, 31b, 32a and 32b. When the control lever 31 is operated in a back-and-forth direction A, an input amount by which the control lever 31 is operated is detected by the potentiometer 31a, which outputs an electrical operation signal X1 depending on the detected input amount. When the control lever 31 is operated in a left-to-right direction B, an input amount by which the control lever 31 is operated is detected by the potentiometer 31b, which outputs an electrical operation signal X2 depending on the detected input amount. When the control lever 32 is operated in a back-and-forth direction C, an input amount by which the control lever 32 is operated is detected by the potentiometer 32a, which outputs an electrical operation signal X3 depending on the detected input amount. When the control lever 32 is operated in a left-to-right direction D, an input amount by which the control lever 32 is operated is detected by the potentiometer 32b, which outputs an electrical operation signal X4 depending on the detected input amount.

The operation signals X1, X2, X3 and X4 outputted respectively from the potentiometers 31a, 31b, 32a and 32b are sent to a control unit 52. The control unit 52 executes predetermined processing based on the operation signals X1, X2, X3 and X4 and outputs control signals to solenoid proportional valves 24L, 24R, 25L, 25R, 26L and 26R, as well as to solenoid proportional valves associated with the swing control valve (not shown). The solenoid proportional valves 24L, 24R, 25L, 25R, 26L and 26R are provided for hydraulically driving the control valves 24, 25 and 26. The shift directions and opening degrees of the control valves 24, 25 and 26 are adjusted in response to pilot pressures instructed by the solenoid proportional valves 24L, 24R, 25L, 25R, 26L and 26R. The solenoid proportional valves for the swing control valve are also likewise adjusted. As a result, the directions and flow rates of the hydraulic fluid supplied from the hydraulic pump 19 to the boom cylinder 11, the arm cylinder 12, the bucket cylinder 13 and the swing motor (not shown) are restricted.

Control levers and control pedals are provided in association with the left and right travel control valves (not shown). When either the control levers or the control pedals is operated, the shift directions and opening degrees of the left and right travel control valves are likewise adjusted.

The remote control system of the present invention is installed in the hydraulic excavator 1 having the above-described construction. The remote control system comprises a machine-side controller 101 provided in the hydraulic excavator 1, and a remote control terminal 102 provided in the office 100. A description is first made of the machine-side controller 101.

An angle sensor 34 for detecting the rotational angle of the boom 8 is mounted to the boom 8, an angle sensor 35 for detecting the rotational angle of the arm 9 is mounted to the arm 9, and an angle sensor 36 for detecting the rotational angle of the bucket 10 is mounted to the bucket 10. The angle sensors 34, 35 and 36 output respectively electrical angle signals $\alpha$, $\beta$ and $\gamma$ depending on the posture of the front working device 7.

Further, an inclination sensor 37 for detecting the transverse inclination angle of the machine body is provided in the cab 6 and outputs an electrical angle signal $\sigma$ depending on the transverse inclination angle of the machine body.

A laser beam stand 51 for emitting a laser beam is installed outside the hydraulic excavator 1, and a laser beam receiver 52 for generating a pulse signal T upon receiving a laser beam R is mounted to a lateral surface of the arm 9 of the hydraulic excavator 1. The laser beam emitted from the laser beam stand 51 forms a laser reference plane R serving as an external reference.

The angle signals $\alpha$, $\beta$, $\gamma$ and $\sigma$ outputted from the angle sensors 34, 35, 36 and the inclination sensor 37, as well as the pulse signal $\tau$ outputted from the laser beam receiver 52 are inputted to the control unit 53. The control unit 53 includes a wireless communication device 54, and computes the fore end position of the bucket 10, the positional relationship of the target excavation plane with respect to the machine body, etc. based on the angle $\alpha$, $\beta$, $\gamma$ and $\sigma$, the pulse signal $\tau$, and setting information of the target excavation plane, which is transmitted from the management office 100 and received by the wireless communication device 54, and then stores computed results as setting values for automatic control. Also, the control unit 53 transmits display information to the remote control terminal 102 of the management office 100 through the wireless communication device 54. Furthermore, in accordance with the setting information, a start instruction (described later) for the automatic control and wireless maneuvering signals, which are all transmitted from the remote control terminal 102 of the management office 100 and received by the wireless communication device 54, the control unit 53 executes area limiting control for controlling the front working device 7 to be kept from going out of a set area, area limiting excavation control for operating the front working device 7 to move along a set area when it is about to go out of the set area, locus control for operating the front working device 7 to move along a set locus, etc.

In the management office 100, the remote control terminal 102 comprises a personal computer 71, a joystick 72, and the wireless communication devices 73, 74. The personal computer 71 comprises a controller 71a, a display unit 71b, and an operation device 71c, and is used as setting means for the automatic control of the hydraulic excavator 1. The display unit 71b has an image display section 71d constituted by, e.g., an LCD. The operation device 71c comprises, as well known, a keyboard and a mouse, including character entry keys, cursor moving keys (up, down, left and right), a return key, numeral entry keys (ten-digit keys), etc. The joystick 72 serves as remote control means for wirelessly maneuvering the hydraulic excavator 1, and has functions equivalent to those of the control lever devices 303L, 303R and the travel control lever (not shown), which are provided in the hydraulic excavator 1 as described above. Upon operation of the joystick 72, it outputs operation signals for the control valves 24, 25 and 26 for the front operating device 7, the swing control valves (not shown), and the left and right travel control valves (not shown).

The wireless communication device 73 is connected to the controller 71a of the personal computer 71, and the controller 71a transfers information between itself and the control unit 53 of the hydraulic excavator 1 through the wireless communication device 73. The wireless communication device 74 is connected to the joystick 72 so that the joystick 72 transmits the operation signal to the control unit 53 of the hydraulic excavator 1 through the wireless communication device 74.

The wireless communication devices 54, 73 and 74 comprise respectively main units 54a, 73a and 74a of the wireless communication device, and antennas 54b, 73b and 74b.

Figure 2:
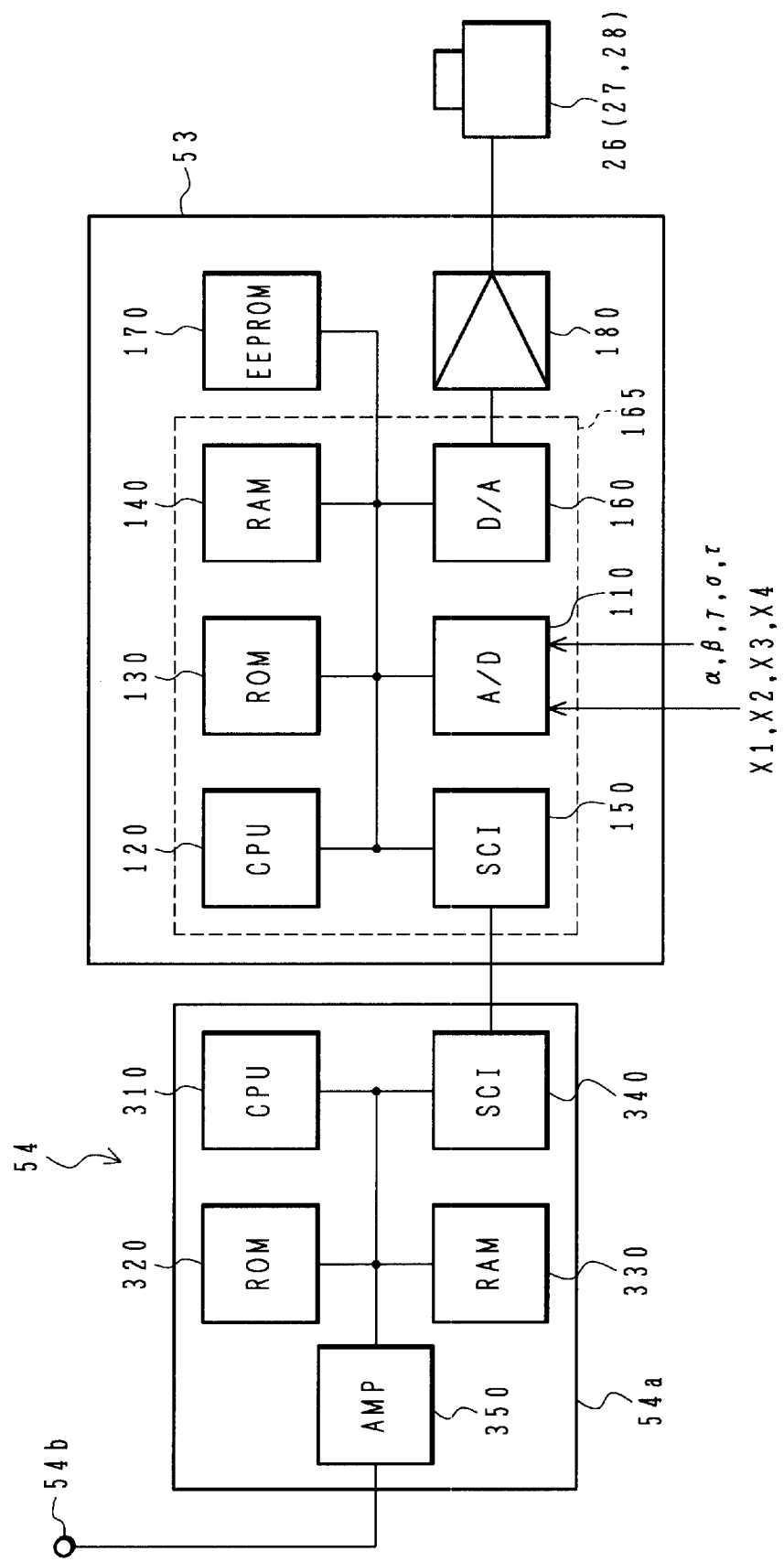
FIG. 2 is a block diagram showing a configuration of a control unit and a wireless communication device both equipped in a hydraulic excavator.

FIG. 2 shows a configuration of the control unit 53 and the wireless communication device 54. The control unit 53 comprises a single-chip microcomputer 165, a nonvolatile memory (EEPROM) 170 storing control constants, dimensional data, etc. per model or grade, and an amplifier 180. The single-chip microcomputer 165 includes an A/D converter 110 for converting the angle signals $\alpha$, $\beta$, $\gamma$ and $\sigma$ inputted from the angle sensors 34, 35, 36 and the inclination sensor 37, the pulse signal $\tau$ inputted from the laser beam receiver 52, as well as the operation signals X1, X2, X3 and X4 inputted from the potentiometers 31a, 31b, 32a and 32b into respective digital signals; a central processing unit (CPU) 120; a read-only memory (ROM) 130 for storing programs of control procedures and constants necessary for the control; a random access memory (RAM) 140 for temporarily storing computed results or numerical values during computations; a serial communication interface (SCI) 150 for communicating with the main unit 54a of the wireless communication device 54; and a D/A converter 160 for converting digital signals into analog signals.

The main unit 54a of the wireless communication device 54 comprises a central processing unit (CPU) 310, a read-only memory (ROM) 320 for storing programs of computations and constants necessary for the computations, a random access memory (RAM) 330 for temporarily storing computed results or numerical values during computations, a serial communication interface (SCI) 340 for communicating with the control unit 53, and an amplifier 350 for amplifying a signal received by the wireless communication antenna 54b.

Figure 3:
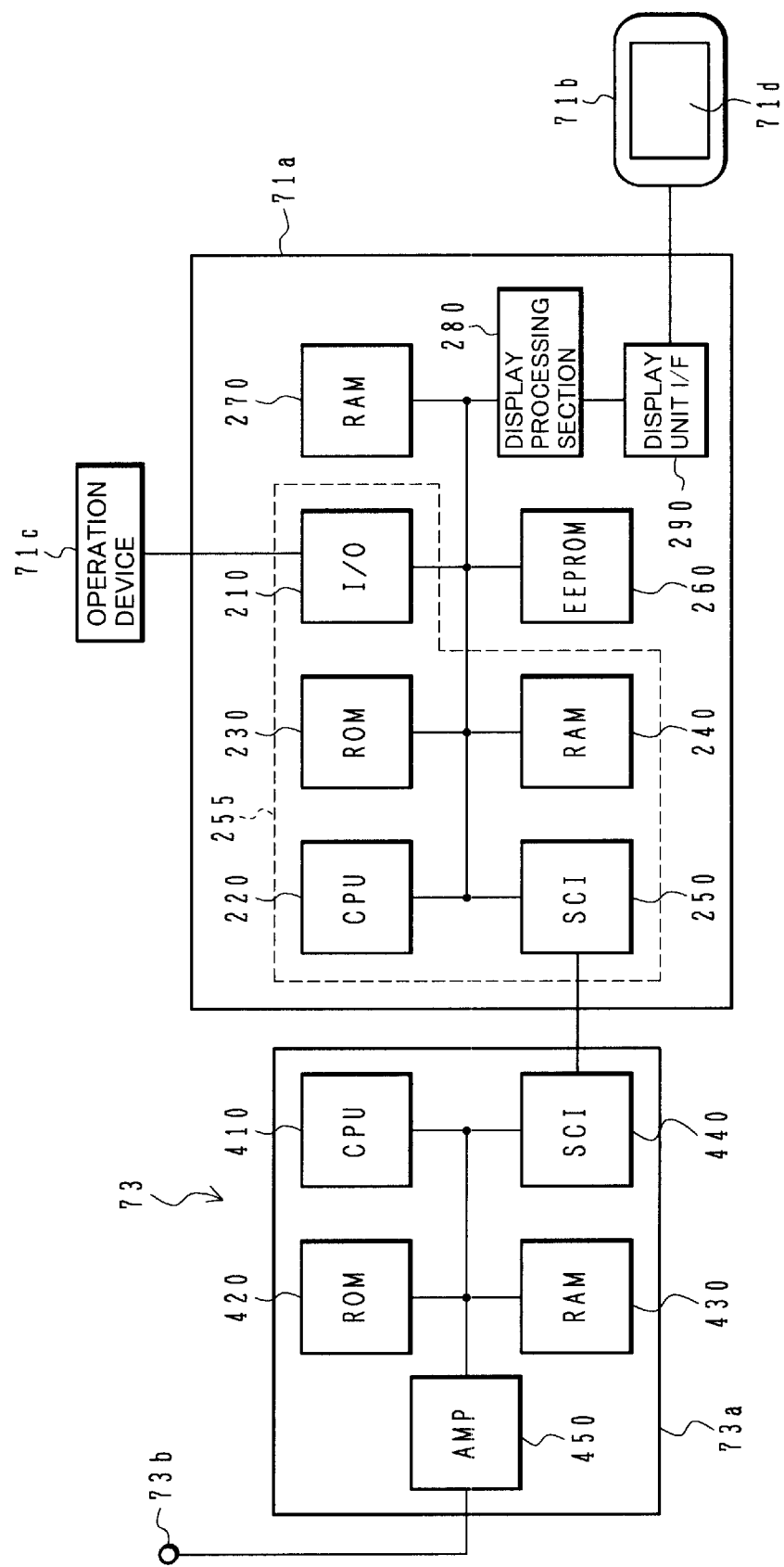
FIG. 3 is a block diagram showing a configuration of a controller in a personal computer and a wireless communication device both provided on the side of a remote control terminal.

FIG. 3 shows a configuration of the controller 71a of the personal computer 71 and the wireless communication device 73. The controller 71a comprises a single-chip microcomputer 255 including an interface (I/O) 210 for taking in the operation signal from the operation device 71c, a central processing unit (CPU) 220, a read-only memory (ROM) 230 for storing programs of control procedures and constants necessary for the control, a random access memory (RAM) 240 for temporarily storing computed results or numerical values during computations, and a serial communication interface (SCI) 250 for communicating with the main unit 73a of the wireless communication device 73; a nonvolatile memory (EEPROM) 260; a memory 270 for drawing and processing the contents displayed on the display unit 71b; a display processing section 280 for executing processing to present display on the display unit 71b; and an interface 290 for outputting the display contents created by the display processing section 280 to the display unit 71b.

The main unit 73a of the wireless communication device 73 comprises, as with the main unit 54a of the wireless communication device, a central processing unit (CPU) 410, a read-only memory (ROM) 420, a random access memory (RAM) 430, a serial communication interface (SCI) 440, and an amplifier 450. The main unit 74a of the wireless communication device 74 of the joystick 72 is also likewise constituted.

Figure 4:
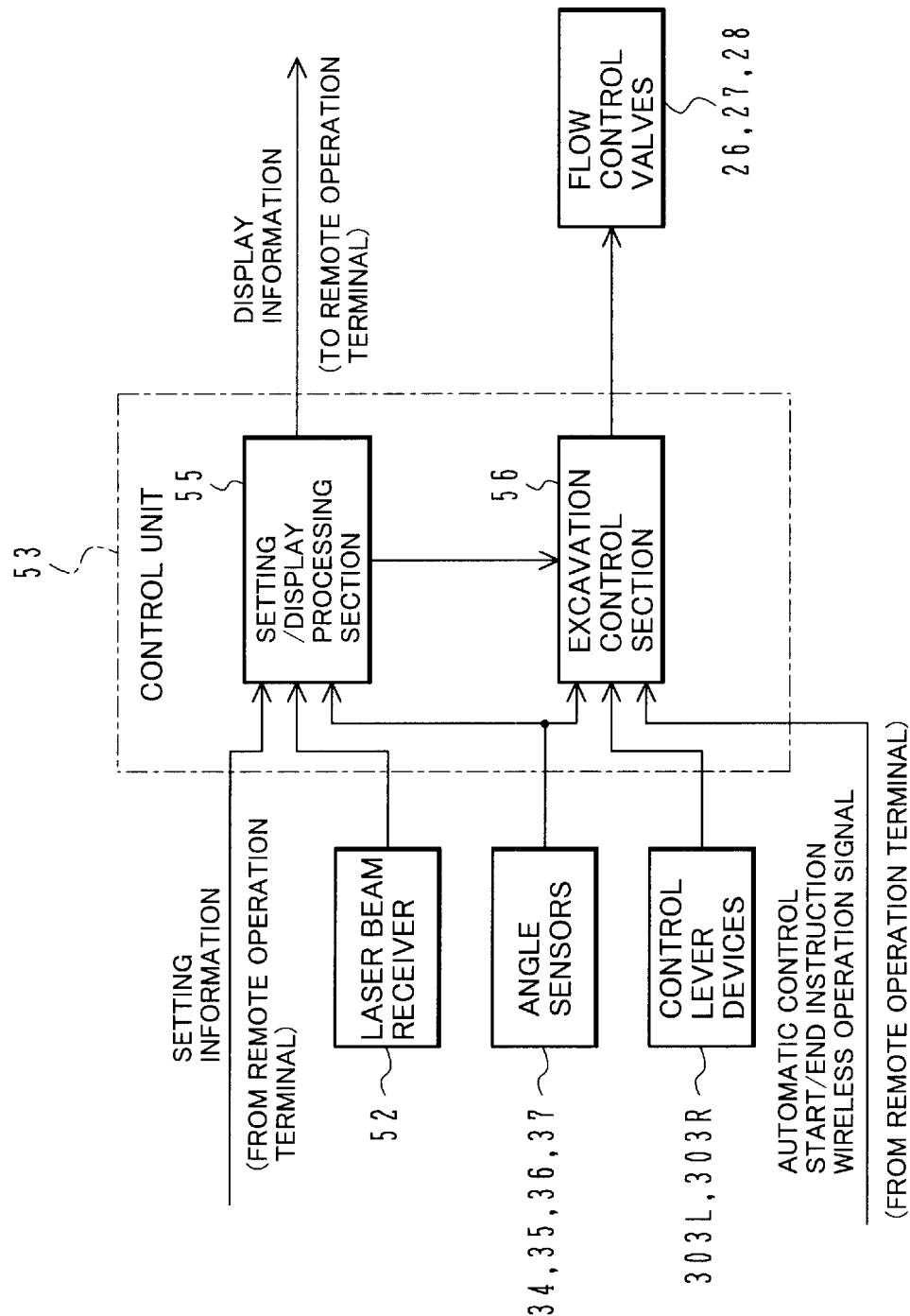
FIG. 4 is a functional block diagram showing an outline of a control program stored in a ROM of the control unit equipped in the hydraulic excavator.

FIG. 4 is a functional block diagram showing an outline of a control program stored in the ROM 130 of the control unit 53. The control unit 53 comprises a setting/display processing section 55 for setting the target excavation screen and executing processing of display information transmitted to the remote control unit 102, and an excavation control section 56 for executing the area limiting excavation control.

The setting/display processing section 55 receives the angle signals α, β, γ and σ from the angle sensors 34, 35, 36 and the inclination sensor 37, the pulse signal τ from the laser beam receiver 52, as well as the setting information (described later) from the remote control terminal 102. Then, the setting/display processing section 55 computes the target excavation plane and the laser reference plane on the basis of an x-z coordinate system set with respect to the machine body of the hydraulic excavator 1 comprising the lower travel structure 2 and the upper swing structure 3, thereby setting the target excavation plane, and also processes the display information displayed on the display unit 71b of the remote control terminal 102.

Based on the target excavation plane set by the setting/display processing section 55, the excavation control section 56 executes processing to create command signals applied to the control valves 24, 25 and 26 for performing the well-known area limiting excavation control.

Figure 5:
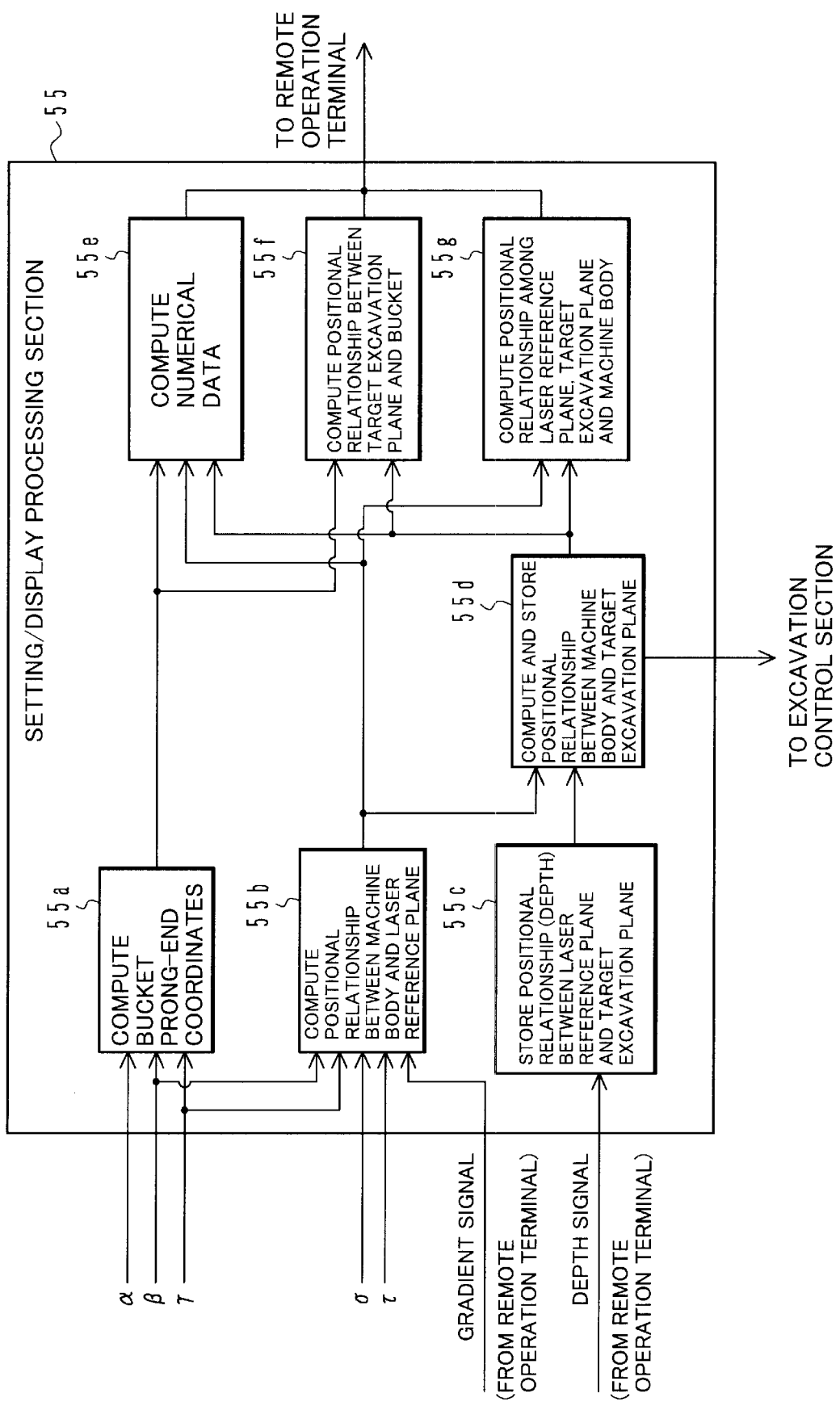
FIG. 5 is a block diagram showing processing functions of a setting/display processing section in the control unit.

FIG. 5 is a block diagram showing processing functions of the setting/display processing section 55. The setting/display processing section 55 has functions executed by a section 55a for computing coordinates of a bucket prong end, a section 55b for computing a positional relationship between the machine body and the laser reference plane, a section 55c for storing a positional relationship (depth) between the laser reference plane and the target excavation plane, a section 55d for computing and storing a positional relationship between the machine body and the target excavation plane, a section 55e for computing numerical data such as the depth of the bucket prong end, a section 55f for computing a positional relationship between the target excavation plane and the bucket, and a section 55g for computing a positional relationship among the laser reference plane, the target excavation plane and the machine body.

The section 55a for computing coordinates of a bucket prong end computes coordinate values (Pvx, Pvz) of the bucket prong end on the basis of the x-z coordinate system by using the x-z coordinate system set with respect to the machine body of the hydraulic excavator 1, the dimensions of the various components, and the angle signals α, β and γ from the angle sensors 34, 35 and 36.

The section 55b for computing a positional relationship between the machine body and the laser reference plane computes a linear equation of the laser reference plane R on the basis of the x-z coordinate system from coordinate values (PLx, PLz) on the x-z coordinate system, which are taken by the laser beam receiver 52 at the time when the laser beam is received by the laser beam receiver 52, the angle signal σ from the inclination sensor 37, and a gradient ε of the target excavation plane set by the remote control terminal 102.

The section 55c for storing a positional relationship (depth) between the laser reference plane and the target excavation plane stores, in the RAM 140, a depth (positional relationship) Ld of the target excavation plane with respect to the laser reference plane R set by the remote control terminal 102.

The section 55d for computing and storing a positional relationship between the machine body and the target excavation plane computes a linear equation of the target excavation plane on the basis of the x-z coordinate system from the positional relationship between the machine body and the laser reference plane computed by the computing section 55b and the depth set value Ld stored in the storing section 55c. The computed linear equation of the target excavation plane is stored in the RAM 140 and is used by the excavation control section 56 as the setting values of the target excavation plane for the area limiting excavation control.

The section 55e for computing numerical data computes, as the display information, numerical values of the depth of the bucket prong end, the gradient of the bucket, the set depth and gradient of the target excavation plane, etc. from the coordinate values of the bucket prong end computed by the computing section 55a, the positional relationship between the machine body and the laser reference plane computed by the computing section 55b, and the positional relationship between the machine body and the target excavation plane computed by the computing section 55d.

The section 55f for computing a positional relationship between the target excavation plane and the bucket computes, as the display information, computes the positional relationship between the target excavation plane and the bucket from the coordinate values of the bucket prong end computed by the computing section 55a and the positional relationship between the machine body and the target excavation plane computed by the computing section 55d.

The section 55g for computing a positional relationship among the laser reference plane, the target excavation plane and the machine body computes, as the display information, from the positional relationship between the machine body and the laser reference plane computed by the computing section 55b and the positional relationship between the machine body and the target excavation plane computed by the computing section 55d.

The numerical values and the positional relationships computed by the computing sections 55e, 55f and 55g are transmitted as the display information to the remote control terminal 102.

Figure 6:
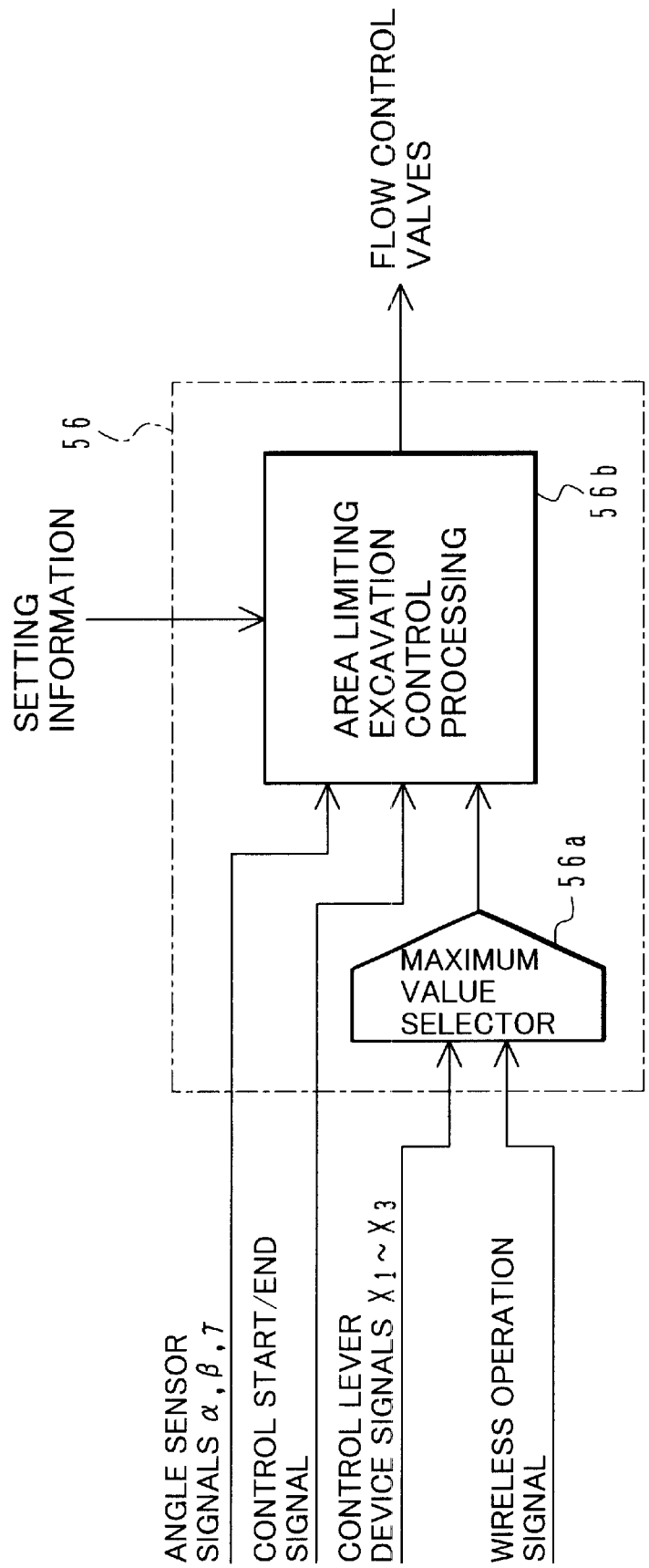
FIG. 6 is a block diagram showing processing functions of an excavation control section in the control unit.

FIG. 6 is a block diagram showing processing functions of the excavation control section 56. The excavation control section 56 has functions executed by an operation-signal maximum value selector 56a and an area limiting excavation control processing section 56b. The maximum value selector 56a compares the operation signals X1 to X3 from the control lever devices 303L, 303R with corresponding ones of the operation signals outputted from the joystick 72 of the remote control terminal 102 for the wireless maneuvering, and then selects a maximum value. The area limiting excavation control processing section 56b receives the operation signal selected as the maximum value, the angle signals α, β and γ from the angle sensors 34, 35 and 36, a control start/end signal from the operation device 71c of the remote control terminal 102, and the setting information of the target excavation plane stored in the computing and storing section 55, executes processing to perform the area limiting excavation control, and then outputs control signals to the flow control valves 24, 25 and 26.

Herein, the term "area limiting excavation control" means a process of setting the target excavation plane on the basis of the machine body, operating the control lever to decelerate a motion of the bucket 10 only in a direction toward the target excavation plane when a part of the front working device 7, e.g., the bucket, approaches the target excavation plane, and controlling the front working device 7 in a semiautomatic manner so as to allow a motion of the bucket 10 along the target excavation plane while preventing the bucket 10 from going out of the target excavation plane when the bucket 10 reaches the target excavation plane. One example of the area limiting excavation control is disclosed in PCT Laid-Open Publication WO95/30059. Also, the area limiting excavation control processing section 56b constitutes front control means for controlling the hydraulic control valves 24, 25 and 26, thereby controlling the operation of the front working device 7 so as to form the target excavation plane.

Figure 7:
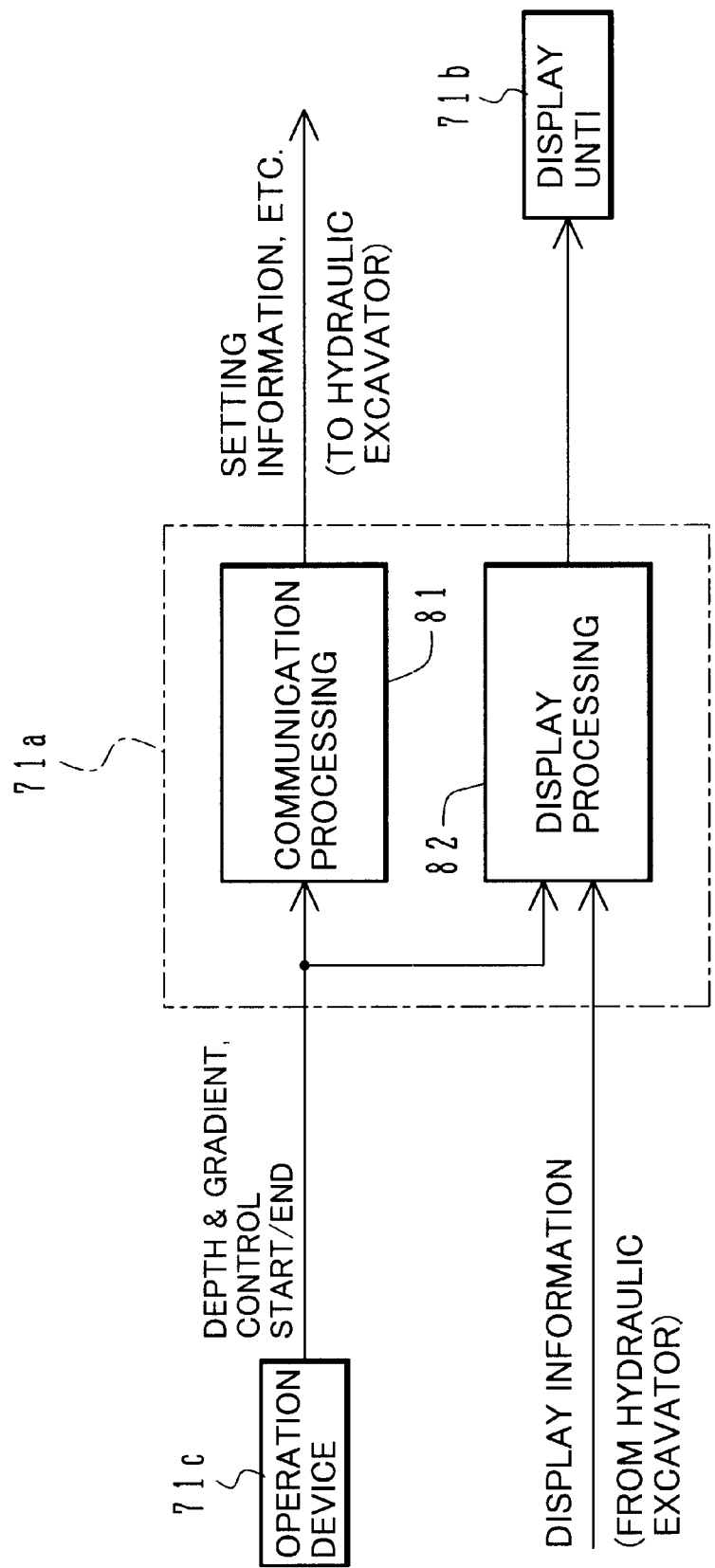
FIG. 7 is a functional block diagram showing an outline of a control program stored in a ROM of the controller in the personal computer provided on the side of the remote control terminal.

FIG. 7 is a functional block diagram showing an outline of a control program stored in the ROM 230 of the controller 71a in the personal computer 71. The control unit 71a comprises a communication processing section 81 for processing information regarding the depth and gradient of the target excavation plane and a start/end instruction for the control, which is inputted from the operation device 71c of the personal computer 71, and a display processing section 82 for executing display processing, based on the display information transmitted from the hydraulic excavator 1 and the operation signal inputted from the operating device 71c, and displaying the processed data on the display unit 71b.

Processing details of the display processing section 82 will be described with reference to FIGS. 8 to 16.

A description is first made of the contents displayed on the image display section 71d of the display unit 71b.

FIGS. 8 and 9 show two kinds of screens selectively displayed on the image display section 71d. FIG. 8 shows an excavation setting screen 61 displaying setting states of the depth and gradient for the automatic control, and FIG. 9 shows an excavation monitoring screen 62 displaying, in an enlarged scale, relative positions of the target excavation plane and the bucket, which are set on the excavation setting screen. Each of those screens 61, 62 has a main screen area 63 in which objective information is displayed, and a menu area 64 positioned on the right side of the main screen area 63 and serving as a sub-screen area. The menu area 64 includes a plurality of items set depending on screen information. The items in the menu screen 64 are each selected and executed using, e.g., the cursor moving keys (up, down, left and right) and the return key of the operation device (keyboard) 71c of the personal computer 71. In other words, a cursor for selectively displaying each item in reverse video is displayed in the menu area 64 and is vertically moved by operating the cursor up-and-down moving keys of the operation device 71c to select a desired one of the items in the menu area 64. Then, by depressing the return key, the contents of the item displayed in reverse video are decided and executed. Instead of using those keys, a desired one of the items may be selected by operating a mouse and then decided and executed by clicking the mouse.

Details of the excavation setting screen 61 and the excavation monitoring screen 62 will be described below.

Referring to FIG. 8, the main screen area 63 of the excavation setting screen 61 displays the machine body in the form of a symbol and also displays the setting states of the depth and gradient of the target excavation plane for the automatic control using numerical values and a straight line movable depending on the set values. Also, when the laser reference plane is used as an external reference, the laser reference plane is displayed in the form of a broken line movable vertically.

Further, the menu area 64 of the excavation setting screen 61 has various items, i.e., "control on/off", "gradient", "depth", and "change of screen". The gradient of the target excavation plane can be set by selecting the item "gradient" in the menu area 64 with the operation of the cursor up-and-down moving keys of the operation device 71c, and then inputting a numerical value with the operation of the numeral entry keys. On that occasion, upon the numeral entry, the numerical value of the gradient displayed on the screen is changed and the gradient of the straight line representing the target excavation plane is also changed. Also, in the case of using the laser reference plane, the target excavation plane is displayed parallel to the laser reference plane and the gradient of the broken line representing the laser reference plane is also changed with the operation of the numeral entry keys. The laser reference plane is set and displayed in such a manner that the laser beam receiver 52, which is mounted to the arm of the front working device as described above, coincides with the laser reference plane, the laser beam receiver 52 outputs a pulse signal. In the case of not using the laser reference plane, the gradient of the target excavation plane is set and displayed with the center of a lower surface of the machine body, for example, defined as a reference.

Similarly, the depth of the target excavation plane can be set by selecting the item "depth" with the operation of the cursor up-and-down moving keys, and then inputting a numerical value with the operation of the numeral entry keys. On that occasion, upon the numeral entry, the numerical value of the depth displayed on the screen is changed and the straight line representing the target excavation plane is vertically moved. Also, in the case of using the laser reference plane, the depth of the target excavation plane is set as a value from the laser reference plane and is moved up and down relative to the laser reference plane. In the case of not using the laser reference plane, the depth of the target excavation plane is set and displayed with the ground surface, for example, defined as a reference.

The automatic control is started by selecting and executing the item "control on/off" in the menu area 64 using the cursor up-and-down moving keys and the return key of the operation device 71c. While the system is under the automatic control, the words "under control" are displayed in the screen as shown. The display of "under control" is continued even when the screen is changed to another one, i.e., the excavation monitoring screen 62, shown in FIG. 9, described later. The setting of the target excavation plane can be made regardless of the control-on/off. The automatic control is brought into an end upon the item "control on/off" being selected and executed again.

When the item "change of screen" in the menu area 64 is selected and executed, the screen is changed from the excavation setting screen 61 to the excavation monitoring screen 62.

The main screen area 63 of the excavation monitoring screen 62 displays, in an enlarged scale, the positional relationship between the target excavation plane and the bucket 10, which has been set on the excavation setting screen 61, using numerical values and a moving illustration. The target excavation plane is displayed, as with the excavation setting screen 61, by indicating a straight line that is moved depending on the setting states. The illustration of the bucket 10 is displayed in the form of a symbolized bucket that is moved and rotated depending on the positional relationship between the posture of the bucket 10 and the target excavation plane calculated by the control unit 53 on the side of the hydraulic excavator 1. Therefore, the operator in the management office can perform works while always confirming the position of the bucket end and the position of the target excavation plane by looking at the screen. Further, the operator can also perform the works with the joystick 72 while looking at the screen even when the automatic control is turned off.

The menu area 64 of the excavation monitoring screen 62 has items "angle unit" and "change of screen". By selecting and executing the item "angle unit" with the cursor up-and-down moving keys and the return key of the operation device 71c, the angle unit of the transverse inclination angle and the bucket angle both displayed in the main screen area 63 can be changed in order of "°"→"%"→"proportion".

When the item "change of screen" in the menu area 64 is selected and executed, the screen is changed from the excavation monitoring screen 62 to the excavation setting screen 61.

FIG. 10 shows a screen transition between the "excavation setting screen 61" and the "excavation monitoring screen 62". The operator can freely change the contents to be displayed on the screen by selecting and executing the item "change of screen" in the menu area 64, as described above, with the cursor up-and-down moving keys and the return key of the operation device 71c.

FIGS. 11 to 16 are flowcharts showing processing procedures of the display processing section 82 that executes the above-mentioned display control.

Figure 11:
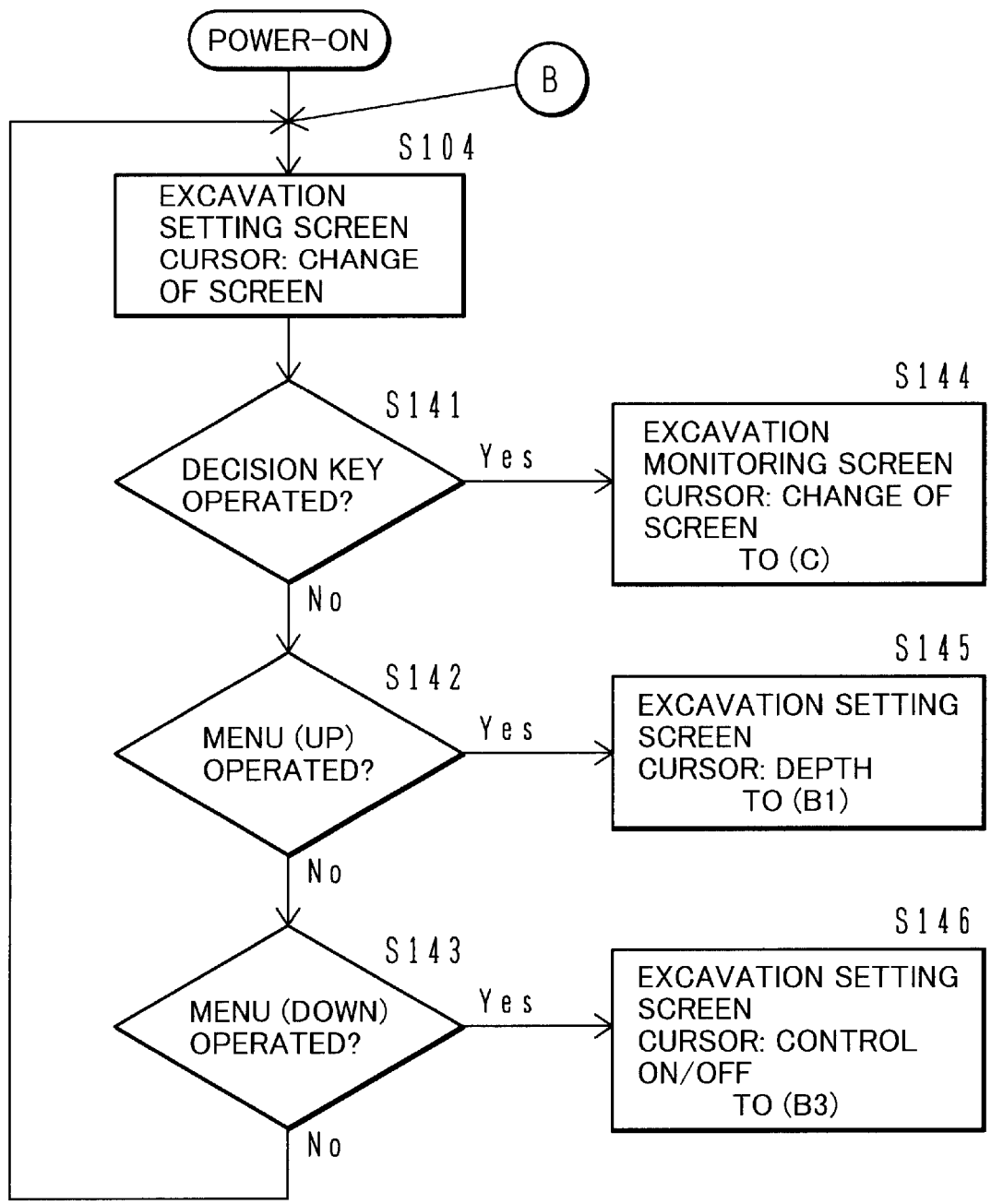
FIG. 11 is a flowchart showing processing procedures executed upon power-on of the controller in the personal computer.

FIG. 11 is a flowchart showing processing procedures executed upon power-on of the controller 71a in the personal computer 71. Upon power-on of the controller 71a, the excavation setting screen 61 is displayed as an initial screen and a cursor initial position in the menu area 64 is set to the item "change of screen" (step S104). Thereafter, the controller determines whether the return key of the operation device 71c is depressed for decision (step S141), and then determines whether a menu-(up or down) operation is instructed with depression of the cursor up-and-down moving keys (steps S142, S143). At this time, the cursor in the menu area is located on the item "change of screen". Therefore, when the return key of the operation device 71c is depressed, the screen is changed to the excavation monitoring screen 62 (step S144). Also, when the cursor up-moving key is depressed, the cursor is moved to the item "depth" (step S145), and when the cursor down-moving key is depressed, the cursor is moved to the item "control on/off" (step S146).

Figure 12:
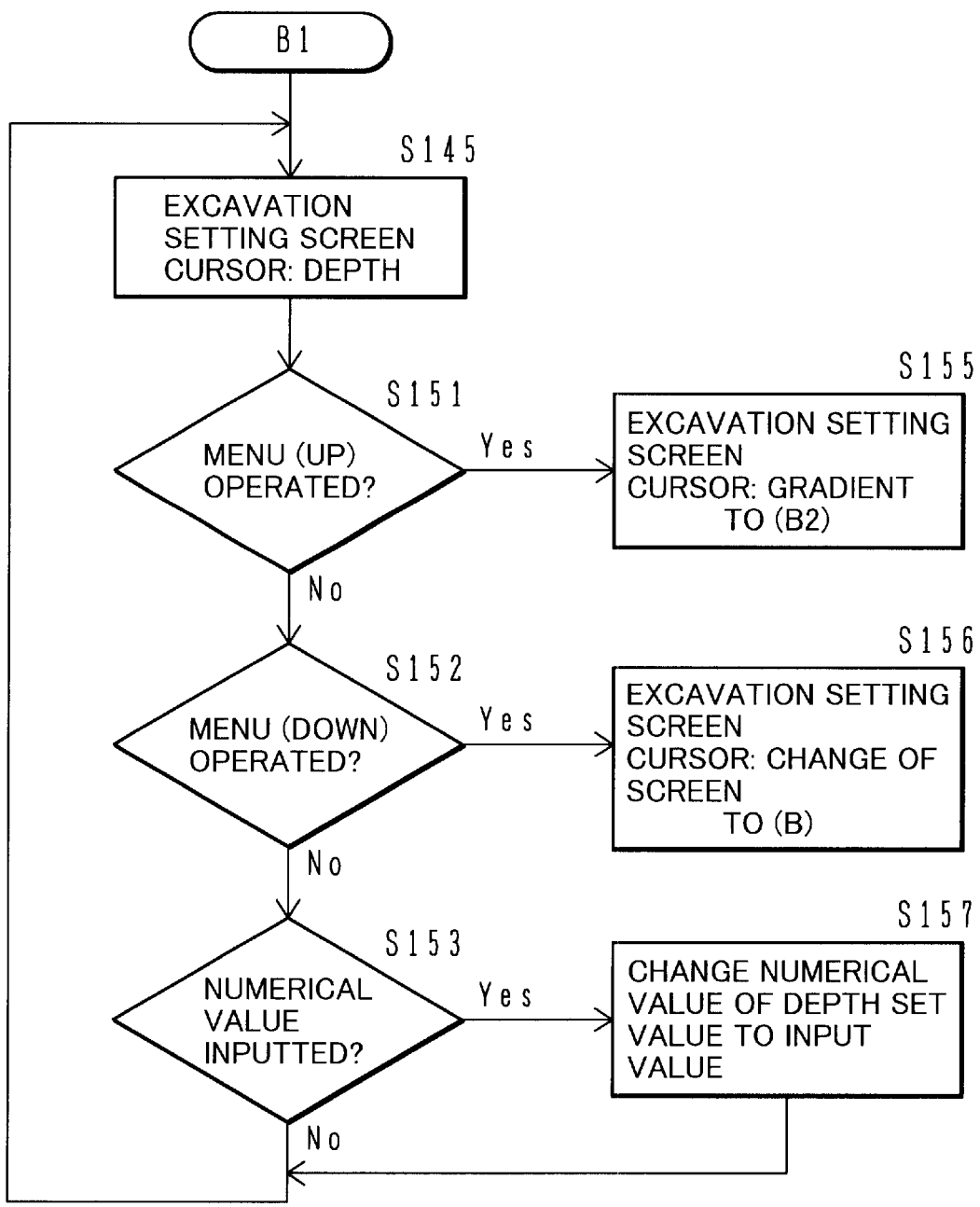
FIG. 12 is a flowchart showing processing procedures executed when a cursor in a menu area of the excavation setting screen is moved to an item "depth".

FIG. 12 is a flowchart showing processing procedures executed when the cursor in the menu area 64 of the excavation setting screen 61 is moved to the item "depth" in step S145 of the flowchart shown in FIG. 11. The controller determines whether the cursor up-and-down moving keys of the operation device 71c are depressed (steps S151, S152), and then determines whether any numerical value is entered with depression of the numeral entry keys (step S153). When the cursor up-moving key is depressed, the cursor is moved to the item "gradient" (step S155), and when the cursor down-moving key is depressed, the cursor is moved to the item "change of screen" (step S156). Also, when the numeral entry keys are depressed, the numeral value representing the depth set value is changed to the entered numerical value (step S157).

Figure 13:
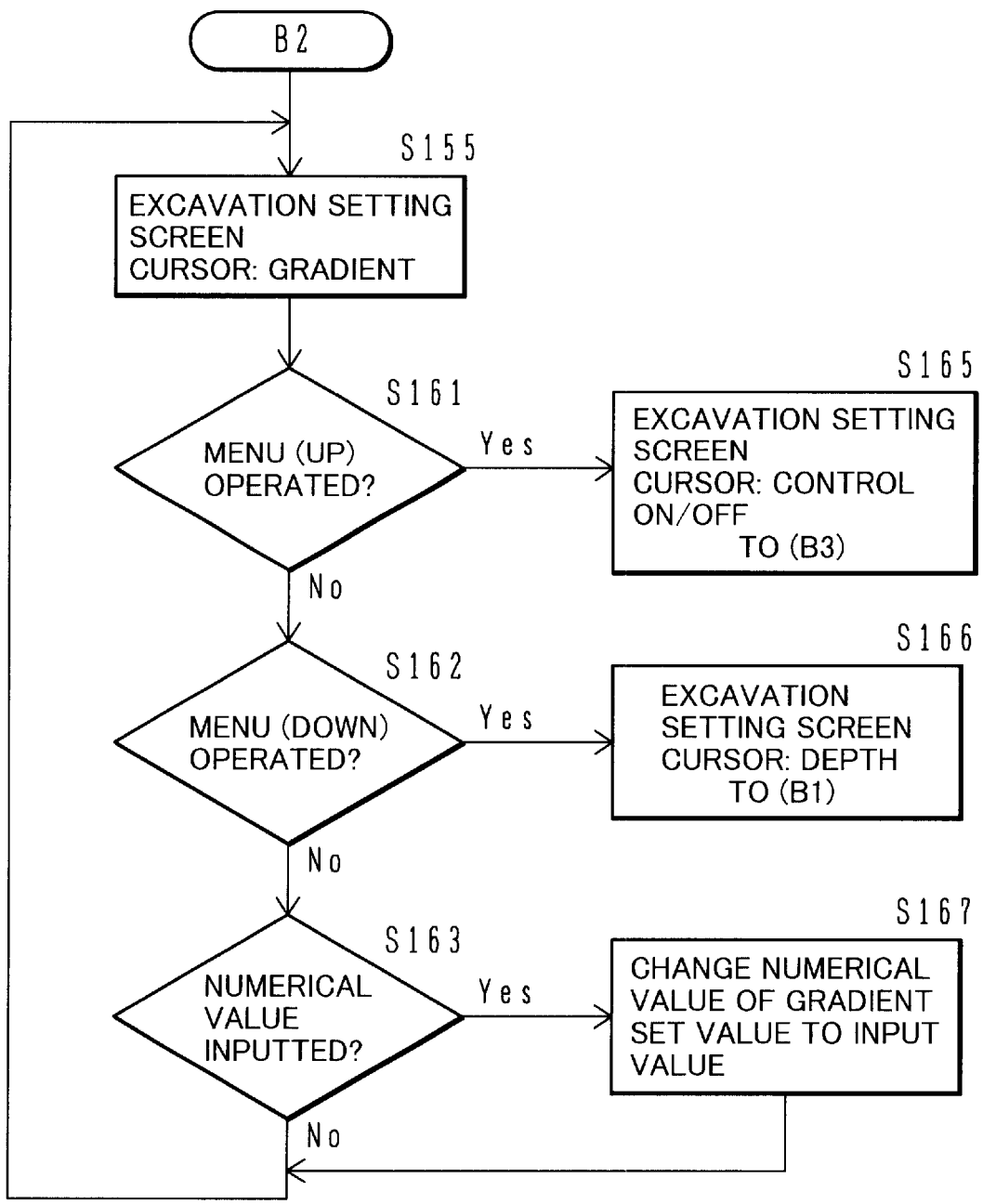
FIG. 13 is a flowchart showing processing procedures executed when the cursor in the menu area of the excavation setting screen is moved to an item "gradient".

FIG. 13 is a flowchart showing processing procedures executed when the cursor in the menu area 64 of the excavation setting screen 61 is moved to the item "gradient" in step S155 of the flowchart shown in FIG. 12. The controller determines whether the cursor up-and-down moving keys of the operation device 71c are depressed (steps S161, S162), and then determines whether any numerical value is entered with depression of the numeral entry keys (step S163). When the cursor up-moving key is depressed, the cursor is moved to the item "control on/off" (step S165), and when the cursor down-moving key is depressed, the cursor is moved to the item "depth" (step S166). Also, when the numeral entry keys are depressed, the numerical value representing the gradient set value is changed to the entered numerical value (step S167).

Figure 14:
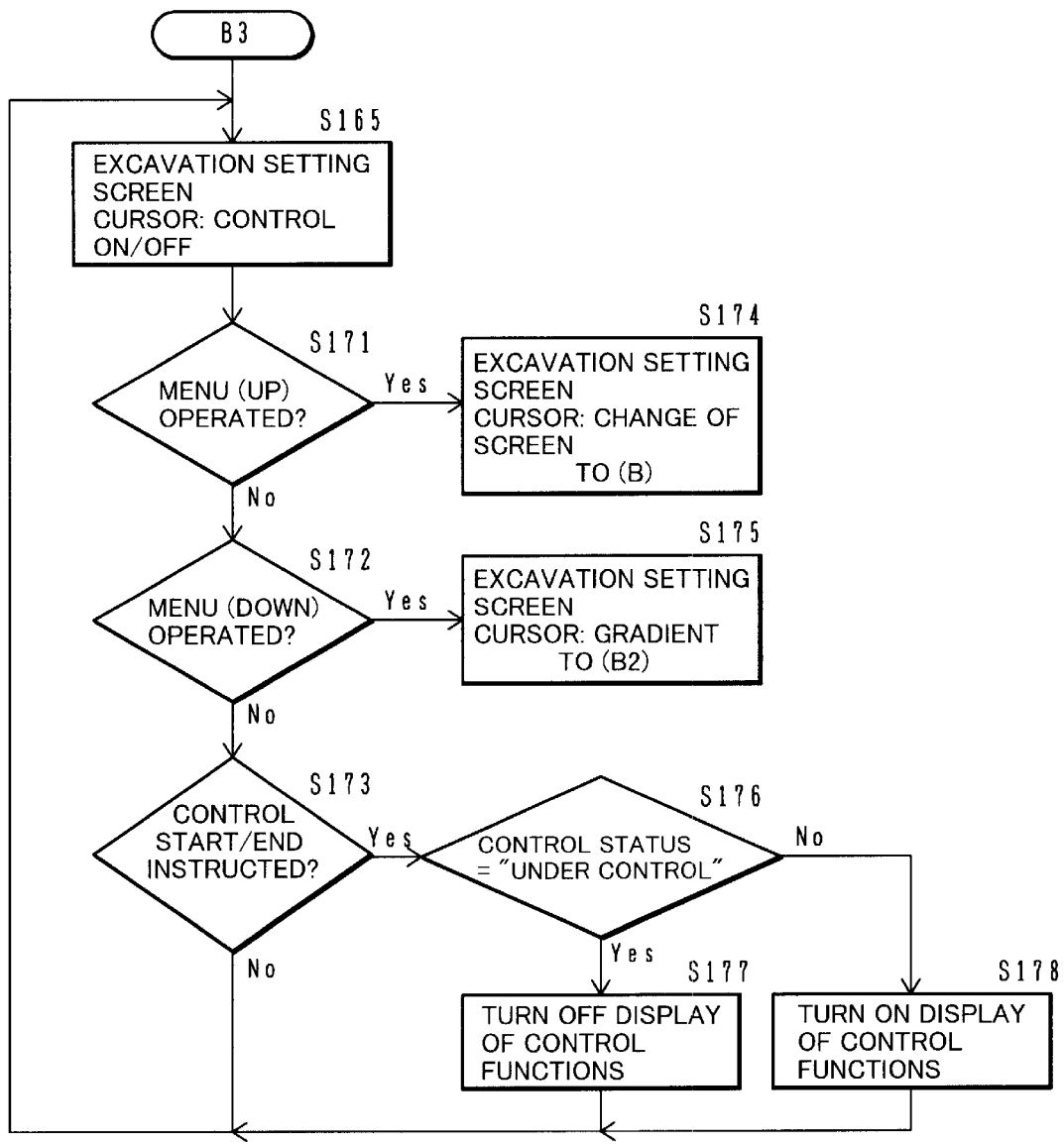
FIG. 14 is a flowchart showing processing procedures executed when the cursor in the menu area of the excavation setting screen is moved to an item "control on/off".

FIG. 14 is a flowchart showing processing procedures executed when the cursor in the menu area 64 of the excavation setting screen 61 is moved to the item "control on/off" in step S165 of the flowchart shown in FIG. 13. The controller determines whether the cursor up-and-down moving keys of the operation device 71c are depressed (steps S171, S172), and then determines whether the return key is depressed (step S173). When the cursor up-moving key is depressed, the cursor is moved to the item "change of screen" (step S174), and when the cursor down-moving key is depressed, the cursor is moved to the item "gradient" (step S175). Also, when the return key is depressed, it is determined whether "under control" is displayed while the system is in the control state (step S176). If the system is in the control state at that time, the display of "under control" is turned off and a control-off command is sent to the control unit (step S177). If the system is not in the control state at that time, the display of "under control" is turned on and a control-on command is sent to the control unit 53 (step S178).

Figure 15:
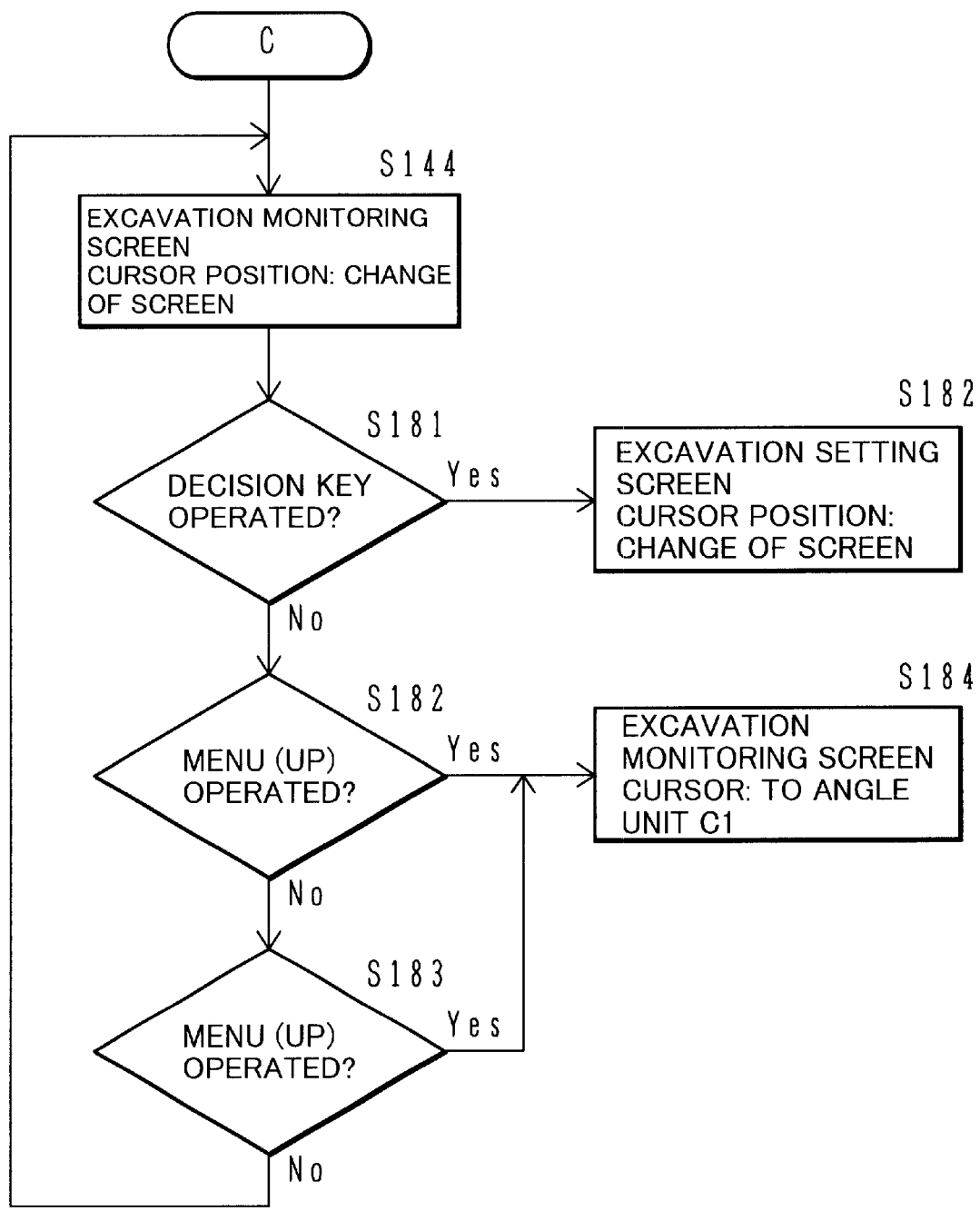
FIG. 15 is a flowchart showing processing procedures executed when the excavation setting screen is changed to excavation monitoring screen.

FIG. 15 is a flowchart showing processing procedures executed when the screen is changed to the excavation monitoring screen 62 in step S144 of the flowchart shown in FIG. 11. At this time, the cursor is located on the item "change of screen". Also, the angle unit of the bucket angle displayed on the excavation monitoring screen 62 is displayed to be "°" as an initial value. Subsequently, the controller determines whether the return key of the operation device 71c is depressed (step S181), and then determines whether the cursor up-and-down moving keys are depressed (steps S182, S183). When the return key is depressed, the screen is changed to the excavation setting screen 61 (step S182A). Also, when the cursor up- or down-moving key is depressed, the cursor is moved to the item "angle unit" (step S184).

Figure 16:
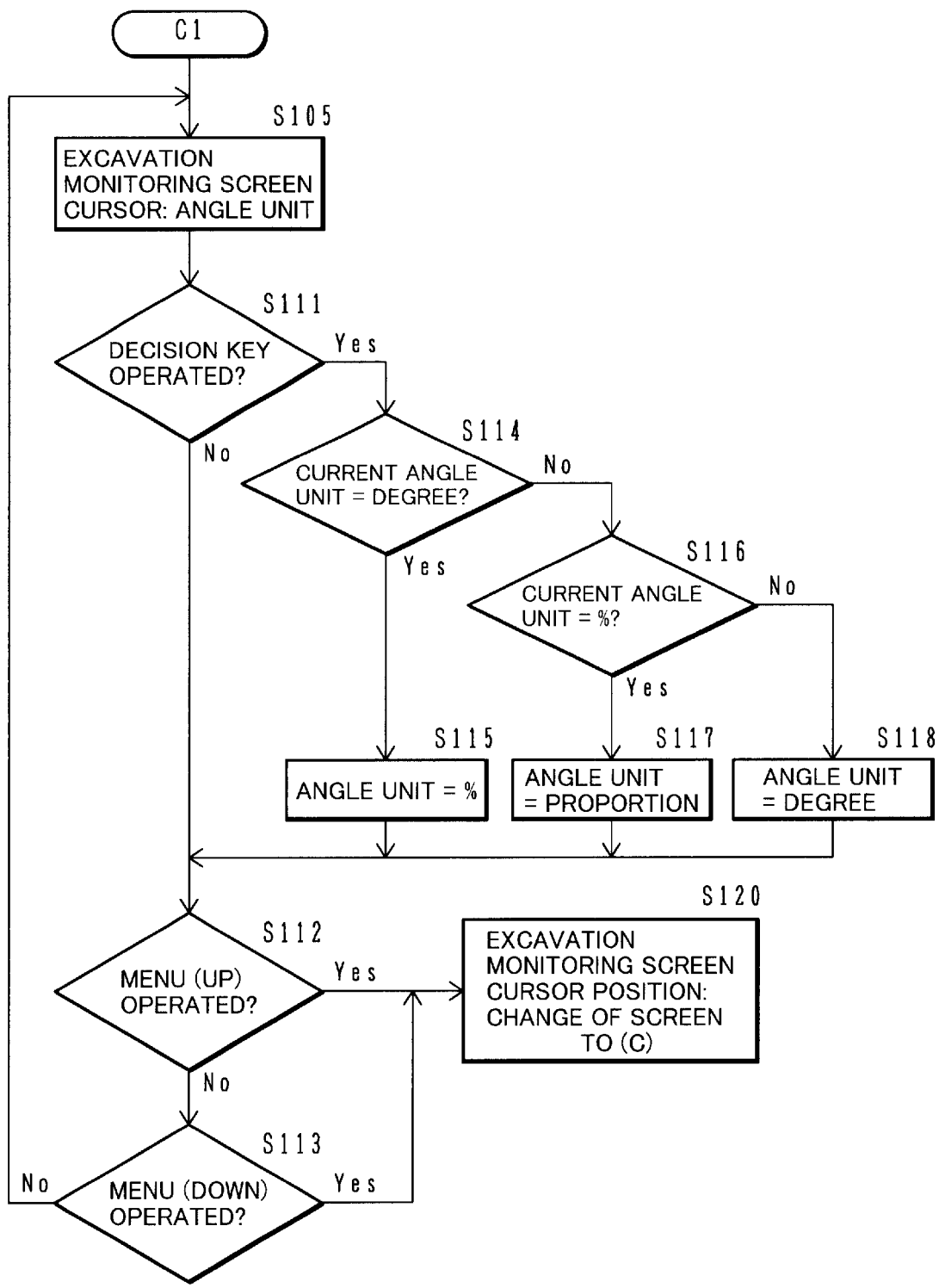
FIG. 16 is a flowchart showing processing procedures executed when a cursor in a menu area of the excavation monitoring screen is moved to an item "angle unit".

FIG. 16 is a flowchart showing processing procedures executed when the cursor is moved to an item "angle unit" in step S184 of the flowchart shown in FIG. 15. The controller determines whether the return key of the operation device 71c is depressed (step S111), and then determines whether the cursor up-and-down moving keys are depressed (steps S112, S113). When the return key is depressed, the controller determines whether the current angle unit is "°"(step S114), and then determines whether the current angle unit is "%" (step 5116). Depending on the determination results in those steps, the angle unit is selectively set to "%" (step S115), "proportion" (step S117), or "°" (step S118). In the excavation monitoring screen 62, is displayed as the initial value of the angle unit of the bucket angle. Therefore, when the return key is depressed for the first time after power-on, the current angle unit is "°" and the determination result in step S114 is "yes", whereby the angle unit is changed to "%" in step S115. Thereafter, when the return key is depressed again, the determination result in step S114 is "no" and the determination result in step S116 is "yes", whereby the angle unit is changed to "proportion" in step S117. Thereafter, when the return key is depressed once more, the determination results in steps S114, S115 are both "no", whereby the angle unit is changed to "°" in step S118.

Further, when the cursor up- or down-moving key is depressed, the cursor is moved to the item "change of screen" (step S120).

Examples of works employing the thus-constituted remote control system will be described below.

First, in the work site, the hydraulic excavator 1 is moved to a position near the target excavation plane along which excavation is to be performed, and the laser beam stand 51 is installed in an appropriate place. The place for installation of the laser beam stand 51 is selected such that the laser reference plane (external reference) R can be formed parallel to the target excavation plane and the laser beam receiver 52 mounted to the arm 9 of the hydraulic excavator 1 can receive the laser beam representing the laser reference plane. Then, the direction of emission of the laser beam from the laser beam stand 51 is adjusted so as to make the angle of the laser reference plane R matched with the angle of the target excavation plane along which excavation is to be performed, and the power supplied to the control unit 53 is turned on. Preparations in the work site are thereby completed. A worker operating the hydraulic excavator informs the end of the preparations to an operator on the side of the management office 100 using, e.g., a cellular phone.

On the other hand, in the management office 100 in which the remote control terminal 102 is installed, the power supplied to the personal computer 71 is turned on and the excavation setting screen 61 is displayed in the display section of the display unit 71b. Here, the initial values of the linear equations representing the depth of the target excavation plane and the laser reference plane are selected such that, upon power-on of the control unit 53, those planes are not displayed on the excavation setting screen 61. In the initial image of the excavation setting screen 61, therefore, the body of the construction machine 1 is displayed, but the target excavation plane and the laser reference plane are not displayed. Further, the gradient of the target excavation plane is set to 0°.

When the end of the preparations is informed from the work site, the operator in the management office operates the joystick 71 to remotely maneuver the front working device 7 of the hydraulic excavator 1, causing the laser beam receiver 52 to receive the laser beam emitted from the laser beam stand 51. Upon the laser beam receiver 52 receiving the laser beam, as described above, the positional relationship between the machine body and the laser reference plane is computed by the computing section 55b and the positional relationship among the laser reference plane, the target excavation plane and the machine body is computed by the computing section 55g in the setting/display processing section 55 of the control unit 53 equipped in the hydraulic excavator 1. The result computed by the computing section 55g is wirelessly transmitted as display information to the management office side, whereby the machine body of the hydraulic excavator 1 and the laser reference plane are displayed on the excavation setting screen 61 of the display unit 71b. At this time, since the setting information of the target excavation plane is given as the above-mentioned initial values, the laser reference plane is horizontally displayed on the excavation setting screen 61.

Then, on the management office side, the operator enters the depth and gradient (setting information) of the target excavation plane using the operation device 71c of the personal computer 71. The operator can perform the entry operation by selecting the item "depth" or "gradient" in the menu area 64 of the excavation setting screen 61 while looking at the main screen area 63. The setting information entered by the operator is wirelessly transmitted to the control unit 53 of the hydraulic excavator 1. Based on the transmitted setting information, the positional relationship between the machine body and the laser reference plane is computed by the computing section 55b, the positional relationship between the machine body and the target excavation plane is computed by the computing section 55d, and the positional relationship among the laser reference plane, the target excavation plane and the machine body is computed by the computing section 55g. The computed results are wirelessly sent back as display information to the management office side, whereby the laser reference plane and the target excavation plane are displayed on the excavation setting screen 61 of the display unit 71b depending on the values entered by the operator. For example, with the entry of the gradient of the target excavation plane, the angle of the laser reference plane displayed on the excavation setting screen 61 is changed correspondingly, and with the entry of the depth of the target excavation plane, the target excavation plane is displayed parallel to the laser reference plane at a corresponding position. Also, with the depth of the target excavation plane changed, the target excavation plane is moved parallel to the laser reference plane correspondingly. Thus, the operator can set the target excavation plane at an optimum position while looking at the excavation setting screen 61.

On the side of the hydraulic excavator 1, the thus-set target excavation plane is stored in the computing section 55d of the control unit 53 as the positional relationship between the machine body and the target excavation plane (in the form of a linear equation on the basis of the x-z coordinate system of the machine body).

During the setting operation described above, it is preferable that communication with the worker in the work site be maintained via the cellular phone, or that an image of the work site be picked up by a camera and the picked-up image information be displayed on a monitoring TV on the side of the management office 100. The operator in the management office 100 can confirm topography information of the site through the communication via the cellular phone or the image displayed on the monitoring TV and hence can set the target excavation plane more satisfactorily.

After the target excavation plane has been set as described above, the operator on the side of the management office 100 selects and executes the item "control on/off" in the menu area 64 of the excavation setting screen 61 for starting the area limiting excavation control of the hydraulic excavator 1. In the area limiting excavation control, the operator operates the joystick 72 to wirelessly maneuver the front working device 7 of the hydraulic excavator 1. As a result, the hydraulic excavator 1 is controlled in a semiautomatic manner such that the bucket fore end does not move beyond the target excavation plane, and hence the target excavation plane can be easily formed.

Also, in the semiautomatic control with the wireless maneuvering, the screen of the display unit 71b may be changed to the excavation monitoring screen 62. Since the positional relationship between the bucket symbol and the target excavation plane is displayed in an enlarged scale on the excavation monitoring screen 62, the operator can perform works while always confirming the positional relationship between the bucket and the target excavation plane by looking at the screen.

This embodiment constituted as described above can provide advantages given below.

1) The area limiting excavation control function for semiautomatically controlling the operation of the front working device 7 is equipped in the hydraulic excavator 1, and the remote control terminal 102 is provided for the hydraulic excavator 1 so that entry of the setting information of the target excavation plane and wireless maneuvering can be performed from the side of the remote control terminal 102. Also, the display unit 71b for displaying the positional relationship between the hydraulic excavator 1 and the target excavation plane is provided in the remote control terminal 102. Therefore, the operator can remotely set the target excavation plane while looking at the screen of the display unit 71b, and can remotely maneuver the front working device 7 to form the target excavation plane by utilizing the semiautomatic control function of carrying out the area limiting excavation control. As a result, the remote-setting of the target excavation plane and the remote maneuvering of the hydraulic excavator 1 can be easily realized.

2) The area limiting excavation control is carried out as semiautomatic control in which the operation of the front working device is controlled based on wireless maneuvering signals from the joystick 72 and the setting information from the operation device 71c. Therefore, a burden imposed on the operator is much reduced in comparison with the case of manual control, and the system can be easily adapted for various work sites just by changing the setting information.

3) The entry of the setting information of the target excavation plane on the side of the remote control terminal 102 is performed by inputting the positional relationship of the target excavation plane relative to the laser reference plane for the hydraulic excavator 1, and the entered setting information is converted on the side of the hydraulic excavator 1 into the positional relationship relative to the hydraulic excavator 1. Therefore, the operator can set the target excavation plane by utilizing the laser reference plane as an external reference. Further, since the positional relationship among the laser reference plane, the target excavation plane and the hydraulic excavator 1 is displayed on the display unit 71b of the remote control terminal 102 at the time of setting, the operator can easily set the target excavation plane while looking at the screen of the display unit.

While, in the above-described embodiment, the setting/display processing section 55 of the control unit 53 on the side of the hydraulic excavator 1 includes the section 55e for computing numerical data such as the depth of the bucket prong end, the section 55f for computing the positional relationship between the target excavation plane and the bucket, and the section 55g for computing the positional relationship among the laser reference plane, the target excavation plane and the machine body, those computing sections may be incorporated in the controller 71a on the side of the remote control terminal 102.

Also, the personal computer 71 and the joystick 72 of the remote control terminal 102 may be installed in places away from each other.

Further, while the wireless communication device 73 for the personal computer 71 and the wireless communication device 74 for the joystick 72 are separately provided in the remote control terminal 102, those wireless communication devices may integrated into one unit.

While, in the above-described embodiment, the display unit 71b and the operation device 71c are provided only on the side of the management office 100, a display unit and an operation device may be provided on the side of the hydraulic excavator 1 as well. In such a case, the operator may ride on the hydraulic excavator 1 to manually perform the setting and control operation depending on situations.

While, in the above-described embodiment, the excavation monitoring screen 62 is prepared as a screen other than the screen (excavation setting screen 61) for displaying, using numerical values and a moving illustration, the setting states of the plane or area as a target for works to be performed under automatic control, one or more other screens may be displayed instead of or in addition to the excavation monitoring screen 62. Conceivable examples of the other screens include an instrument information screen for displaying information of instruments such as a fuel meter, hydraulic pressure and temperature meters, and an engine cooling water temperature meter, an abnormality alarm information screen for displaying a abnormal water temperature and an abnormal oil temperature, and operating information screen for displaying operating information such as the engine revolution speed, the excavation load, the travel load, and the swing load.

Other embodiments of the present invention will be described below.

The laser reference plane is employed as an external reference in the above-described embodiment, but any external coordinate system, of which position and posture are known, can also be employed as an external reference. A typical example of the external coordinate system, of which position and posture are known, is a global coordinate system used in a GPS (global positioning system). The global coordinate system means an orthogonal coordinate system having the origin set to the center of an ellipsoid representing the globe. By measuring and grasping the position and direction of the hydraulic excavator 1 based on the GPS with the global coordinate system being an external reference, and displaying both topography data and design data, which are correlated to the GPS information, on the display unit, the design data can be used as the target work plane.

More specifically, one or more GPS antennas are installed on the machine body, and the position of each GPS antenna is detected as information of the latitude, longitude and altitude with respect to the globe by using signals from a plurality of GPS satellites. The detected information is converted into values on the global coordinate system and subjected to predetermined arithmetic processing, thereby determining the position of the hydraulic excavator and the direction of the machine body. The arithmetic processing may be executed in the controller equipped in the hydraulic excavator, but it is preferably executed in the controller of the personal computer equipped in the management office. Working data having been three-dimensionally processed using the information of the latitude, longitude and altitude with respect to the globe is set beforehand in the controller of the personal computer. The working data includes topography data and working plan lines (design data). The display unit of the personal computer receives the information regarding the position and direction of the hydraulic excavator and the three-dimensional working data, and then displays them. Further, the controller of the personal computer compares the information regarding the position and direction of the hydraulic excavator with the three-dimensional working data, computes the target excavation plane with respect to the current position and direction of the machine body, and converts the setting information of the target excavation plane into setting information on the basis of the machine body of the hydraulic excavator, followed by transmitting the converted setting information to the hydraulic excavator. The hydraulic excavator stores the transmitted setting information for use in automatic control. As an alternative, the setting information of the target excavation plane obtained from the working data may be transmitted to the hydraulic excavator, and the transmitted setting information may be converted on the side of the hydraulic excavator 1 into setting information on the basis of the machine body.

FIGS. 17 to 20 show a second embodiment of the present invention, which embodies a method of specifying the position and direction of the hydraulic excavator on the basis of the global coordinate system by using two GPS antennas. In the drawings, identical members to those shown in FIG. 1 are denoted by the same reference numerals.

Figure 17:
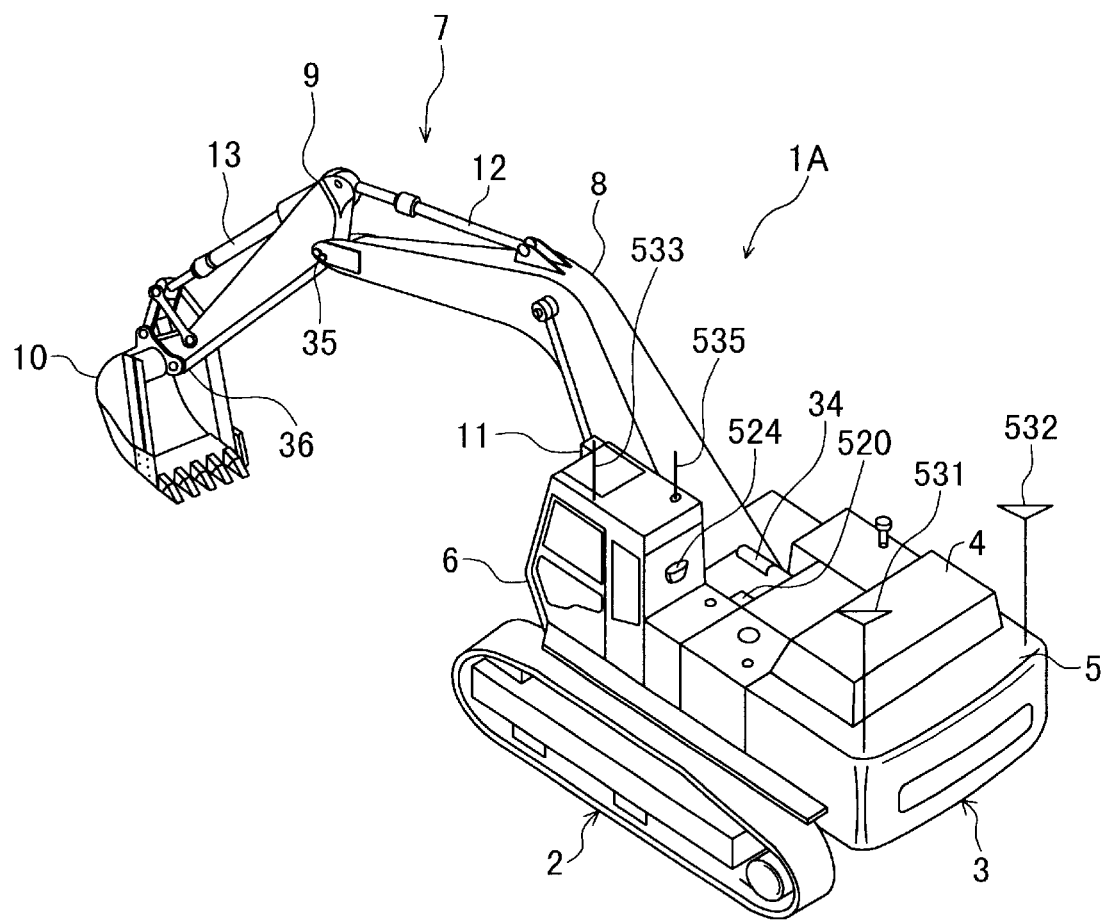
FIG. 17 shows an external appearance of a hydraulic excavator according to a second embodiment of the present invention.

FIG. 17 shows an external appearance of a hydraulic excavator according to this embodiment. A hydraulic excavator 1A includes, in addition to the boom rotational angle sensor 34, the arm rotational angle sensor 35, and the bucket rotational angle sensor 36, an angle sensor 520 for detecting a rotational angle (swing angle) of the upper swing structure 3 relative to the lower travel structure 2, and an inclination sensor 524 for detecting an inclination angle (pitch angle) in the longitudinal direction and an inclination angle (roll angle) in the transverse direction of the upper swing structure 3.

Also, the hydraulic excavator 1A includes two GPS antennas 531, 532 for receiving position signals from the GPS satellites, a radio antenna 533 for transmitting the received position signals to the management office 100, and a radio antenna 535 for transmitting the signals from the various sensors 34 to 36, 520 and 524 to the management office 100 and receiving various data, such as wireless maneuvering signals, setting information of the target excavation plane and display information (described later), from the management office 100. The two GPS antennas 531, 532 are installed at left- and right-side positions of the upper swing structure 3 in its rear portion, which are away from the center of swing of the upper swing structure.

Figure 18:
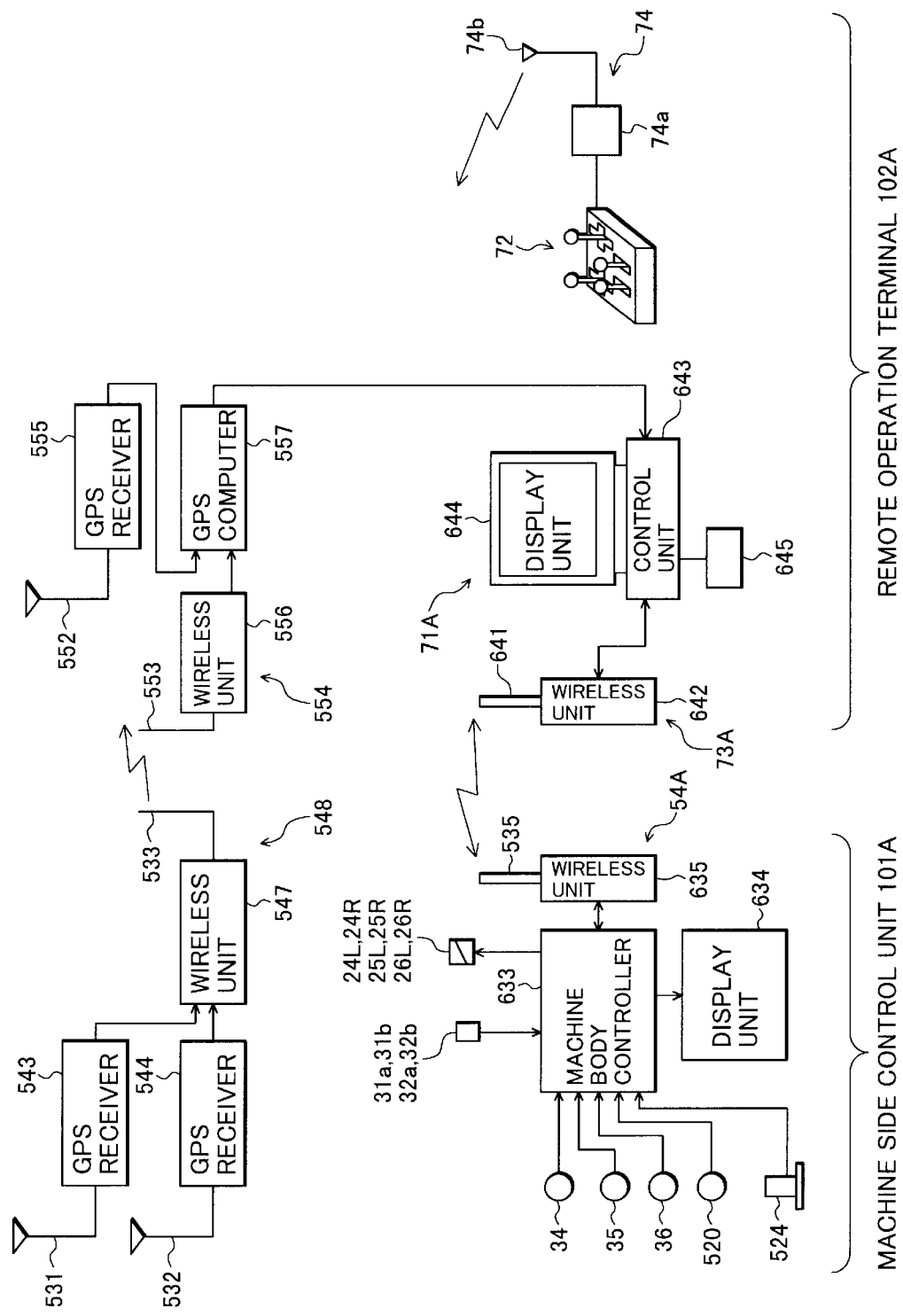
FIG. 18 shows an overall configuration of a remote control system and a remote setting system according to the second embodiment.

FIG. 18 shows an overall configuration of a remote control system and a remote setting system according to this embodiment.

A machine-side control unit 101A comprises a machine body controller 633, a display unit 634, a wireless communication device 54A made up of a radio antenna 535 and a wireless unit 635, GPS antennas 531, 532 and GPS receivers 543, 544, and a wireless communication device 548 made up of a radio antenna 533 and a wireless unit 547.

A remote control unit 102A comprises a personal computer 71A made up of a control unit 643, a display unit 644 and an operation device 645, a wireless communication device 73A made up of a radio antenna 641 and a wireless unit 642, a joystick 72, a wireless communication device 74 made up of a wireless unit 74a and a radio antenna 74b, a wireless communication device 554 made up of a radio antenna 553 and a wireless unit 556, a GPS antenna 552, a GPS receiver 555, and a GPS computer 557.

The operation on the side of the machine-side control unit 101A is essentially the same as that in the first embodiment except for that the machine body controller 633 receives the signals from the sensors 34 to 36, 520 and 524, and transmits those signals to the remote control terminal 102A through the antenna 535 and the wireless unit 635, that the display information is received from the remote control terminal 102A through the antenna 535 and the wireless unit 635 and then displayed on the display unit 634, and that the position information of the GPS antennas 531, 532 received by the GPS receivers 543, 544 is transmitted to the remote control terminal 102A through the antenna 533 and the wireless unit 547.

On the side of the remote control terminal 102A, the signals from the sensors 34 to 36, 520 and 524 transmitted from the machine-side control unit 101A are received through the antenna 641 and the wireless unit 642, and then inputted to the control unit 643 of the personal computer 71A. Also, the position information of the GPS antennas 531, 532 transmitted from the machine-side control unit 101A is received through the antenna 553 and the wireless unit 556, and then inputted to the control unit 643 of the personal computer 71A after being corrected by the GPS computer 557.

For achieving position measurement with high accuracy, RTK (real time kinematic) measurement is performed in this embodiment. The GPS antenna 552, the GPS receiver 555 and the GPS computer 557 serve as a base station for the RTK measurement. The GPS computer 557 creates correction data based on both three-dimensional position data of the antenna 552 measured beforehand and the position signal from the GPS satellite received by the GPS antenna 552, and corrects the position information received by the GPS antennas 531, 532 and obtained from the GPS satellites in accordance with the correction data, thereby performing the RTK measurement of the three-dimensional positions of the GPS antennas 531, 532. With the RTK measurement, the three-dimensional positions of the GPS antennas 531, 532 are measured with accuracy of about ±1 to 2 cm. The measured three-dimensional position data is inputted to the control unit 643 of the personal computer 71A.

Working data having been three-dimensionally processed using the information of the latitude, longitude and altitude with respect to the globe is inputted to the control unit 643 and stored in a memory. The working data can be inputted using the operation device 645. In this connection, the working data may be created using the operation device 645 and then stored. Alternatively, the working data externally created may be installed and stored in the control unit 643 using a recording medium such as an MO. Before being stored, the working data may be further processed. The working data preferably includes topography data and working plan lines (design data), but it may include only working plan lines (design data). Based on the information inputted from the wireless unit 642 and the GPS computer 557, the control unit 643 computes the target excavation plane on the basis of the global coordinate system with respect to the current position and direction of the machine body, and displays the target excavation plane on the display unit 644 together with a symbolic illustration of the hydraulic excavator and a relevant portion of the working data. Also, the control unit 643 converts the setting information of the target excavation plane into setting information on the basis of the machine body of the hydraulic excavator, and then transmits the converted setting information to the machine-side control unit 101A. The machine-side control unit 101A stores the transmitted setting information in the control unit 643 for use in control of the front working device 7.

Further, for monitoring the operating state of the hydraulic excavator and the state of work execution, the control unit 643 computes the bucket end position of the front working device 7 on the basis of the global coordinate system, displays the computed result on the display unit 644, and then transmits the display information to the machine-side control unit 101A together with the display information of the target excavation plane and the symbolic illustration of the hydraulic excavator. The machine-side control unit 101A displays the transmitted display information on the display unit 634 through the control unit 643. This enables the operator to ride on the hydraulic excavator 1A and to manually perform the control operation depending on situations.

Figure 19:
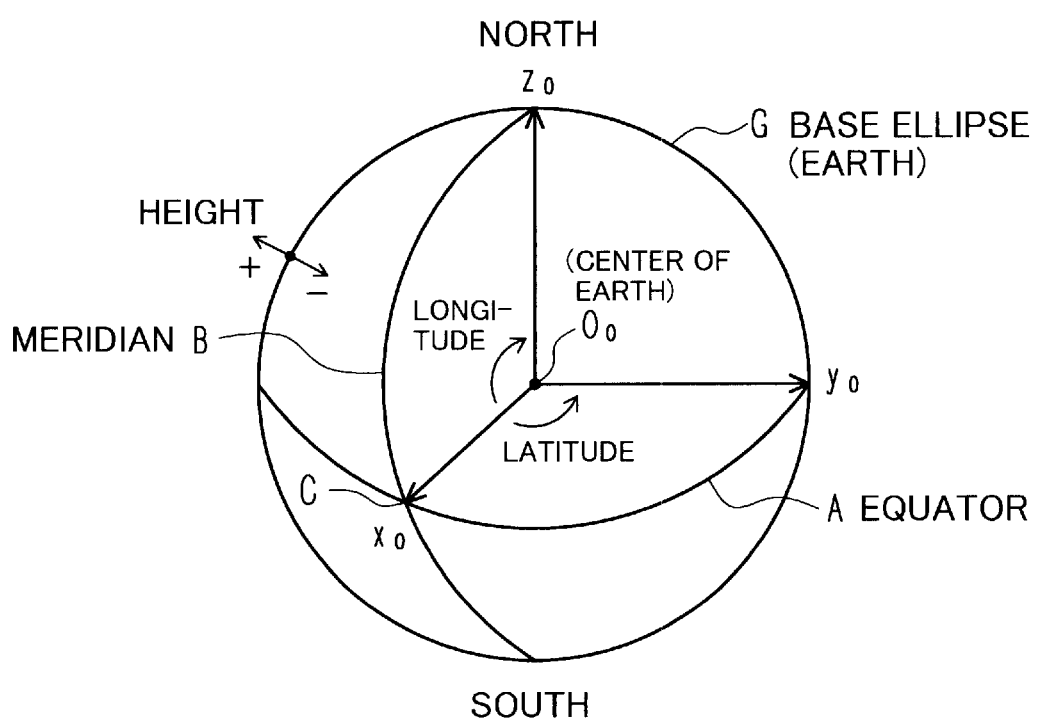
FIG. 19 is an illustration for explaining a global coordinate system.

FIG. 19 is an illustration for explaining the concept of the global coordinate system.

In FIG. 19, G denotes an ellipsoid representing the globe, and the origin $O_0$ of the global coordinate system $\Sigma_G$ is set to the center of the representative ellipsoid G. Also, an $x_0$-axis of the global coordinate system $\Sigma_G$ is positioned on a line passing an intersect C between the equator A and the meridian B and the center of the representative ellipsoid G, a $z_0$-axis is positioned on a line extended toward the south and north from the center of the representative ellipsoid G, and a $y_0$-axis is positioned on a line orthogonal to both the $x_0$-axis and the $z_0$-axis. With the GPS, a position on the globe is expressed using the latitude, longitude and height (depth) with respect to the representative ellipsoid G. By thus setting the global coordinate system $\Sigma_G$, therefore, the GPS position information can be easily converted into values on the global coordinate system $\Sigma_G$.

Figure 20:
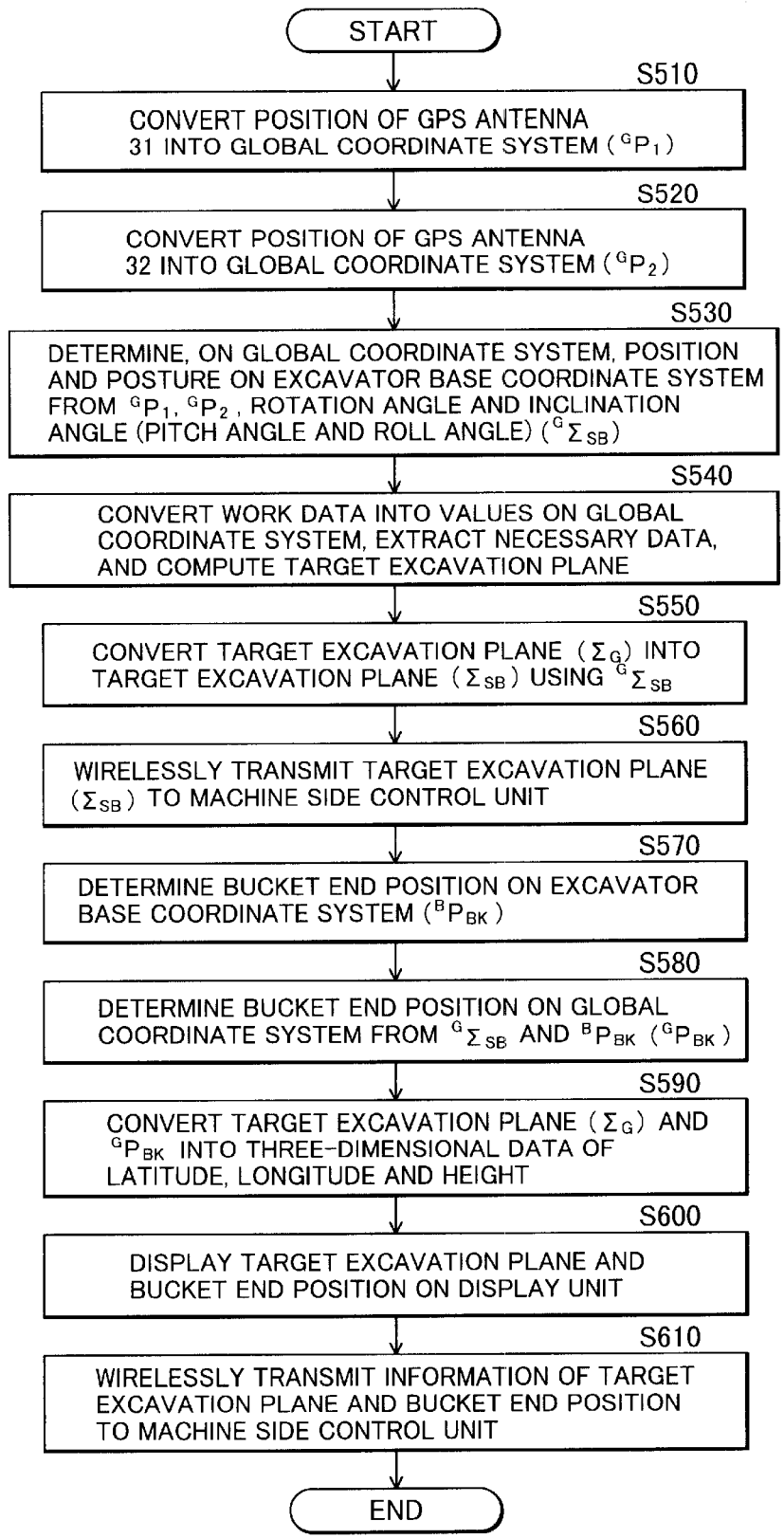
FIG. 20 is a flowchart showing processing procedures.

FIG. 20 is a flowchart showing one example of the processing procedures of the control unit 643.

First, the three-dimensional position (latitude, longitude and height) of the GPS antenna 531 determined by the GPS computer 557 is converted into a value $^GP_1$ on the global coordinate system $\Sigma_G$ (step S510). A computation formula for that conversion is generally well known and hence omitted here. Likewise, the three-dimensional position of the GPS antenna 532 determined by the GPS computer 557 is converted into a value $^GP_2$ on the global coordinate system $\Sigma_G$ (step S520). Then, the position and posture (direction of the lower travel structure 2) of an excavator-base coordinate system $\Sigma_{SB}$ are determined as values $^G\Sigma_{SB}$ on the global coordinate system $\Sigma_G$ from the three-dimensional positions $^GP_1$, $^GP_2$ of the GPS antennas 531, 532 on the global coordinate system $\Sigma_G$ determined in the preceding step, the swing angle detected by the swing angle sensor 520, the inclination angle (including the pitch angle and the roll angle) detected by the inclination sensor 524, and the positional relationships of the GPS antennas 531, 532 relative to the origin of the excavator-base coordinate system $\Sigma_{SB}$ which are stored in the memory (step S530). The computation in this step is based on coordinate transform and hence can be executed using general mathematical techniques.

Herein, the excavator-base coordinate system $\Sigma_{SB}$ means an orthogonal coordinate system that is fixedly set on the lower travel structure 2 of the hydraulic excavator and has one of three axes positioned on or near a rotation axis of the upper swing structure 3.

Then, the working data stored in the memory of the control unit 643 is read out, converted into data on the global coordinate system $\Sigma_G$, and compared with the excavator-base coordinate system $^G\Sigma_{SB}$ on the basis of the global coordinate system to extract a part of the working data as two-dimensional data with respect to the position and direction of the excavator-base coordinate system $^G\Sigma_{SB}$, following which the target excavation plane ($\Sigma_G$) is computed from the extracted part of the working data (step S540). Thereafter, the target excavation plane ($\Sigma_G$) is converted into values on the excavator-base coordinate system $\Sigma_{SB}$ using the coordinate data of the excavator-base coordinate system $^G\Sigma_{SB}$ (step S550). The computation in this step is also based on coordinate transform and hence can be executed using general mathematical techniques. The target excavation plane ($\Sigma_{SB}$) converted into the values on the excavator-base coordinate system $\Sigma_{SB}$ is transmitted to the machine-side control unit 101A through the antenna 641 and the wireless unit 642 (step S560). The machine-side control unit 101A stores the transmitted setting information in the control unit 643 for use in control of the front working device 7.

Then, a bucket end position $^BP_{BK}$ on the excavator-base coordinate system $\Sigma_{SB}$ is determined from the boom angle, the arm angle and the bucket angle detected by the angle sensors 34 to 36, the swing angle detected by the swing angle sensor 520, the positional relationship between the origin of the excavator-base coordinate system $\Sigma_{SB}$ and the base end of the boom 8, as well as the dimensions of the boom 8, the arm 9 and the bucket 10, which are stored in the memory (step S570). The computation in this step is also based on coordinate transform and hence can be executed using general mathematical techniques. Thereafter, a bucket end position $^GP_{BK}$ on the global coordinate system $\Sigma_G$ is determined from the excavator-base coordinate system values $^G\Sigma_{SB}$ on the basis of the global coordinate system $\Sigma_G$, which have been determined in step S530, and the bucket end position $^BP_{BK}$ on the excavator-base coordinate system determined in step S570 (step S580) Subsequently, the target excavation plane ($\Sigma_G$) on the global coordinate system determined in step S540 and the bucket end position $^GP_{BK}$ on the global coordinate system determined in step S580 are converted into three-dimensional data of the latitude, longitude and height (step S590). A computation formula for that conversion is generally well known and hence omitted here.

Then, the target excavation plane and the bucket end position both converted into three-dimensional data of the latitude, longitude and height are displayed on the display unit 644 (step S600). Further, the information of the target excavation plane and the bucket end position is transmitted to the machine-side control unit 101A through the antenna 641 and the wireless unit 642 (step S610). In the machine-side control unit 101A, the transmitted information is displayed on the display unit 634 through the control unit 643. On this occasion, topography data, which is included in the part of the working data extracted in step S540 as the two-dimensional data with respect to the position and direction of the excavator-base coordinate system $^G\Sigma_{SB}$, may also be converted into three-dimensional data of the latitude, longitude and height, and displayed on the display units 644, 634.

In this embodiment thus constituted, since the position and direction of the machine body (lower travel structure 2) of the hydraulic excavator 1A on the basis of the global coordinate system (i.e., the position and posture of the excavator-base coordinate system $^G\Sigma_{SB}$ on the basis of the global coordinate system) are specified using the two GPS antennas 531, 532 installed on the upper swing structure 3 as a part of the machine body of the hydraulic excavator 1A, the remote setting of the target excavation plane and the remote maneuvering of the hydraulic excavator can be easily performed by utilizing the working data that has been three-dimensionally processed using the information of the latitude, longitude and altitude with respect to the globe. Also, even when the hydraulic excavator travels and moves to another place, the position and direction of the machine body can be specified, whereby the remote setting of the target excavation plane and the remote maneuvering of the hydraulic excavator 1 can be performed by utilizing the working data regardless of the movement of the hydraulic excavator.

Further, since the position of the fore end (monitoring point) of the bucket 7 of the working device is measured, it is possible to monitor the operating state and the state of work execution.

Moreover, with this embodiment, since the setting information of the target excavation plane of the hydraulic excavator is wirelessly sent from the remote control terminal 102A in the management office, there is no need of storing the working data, i.e., a very large amount of electronic data, in the machine-side control unit 101A, and the operator can confirm the target excavation plane for the current position of the machine body while looking at the display unit 634 in the management office. Additionally, since a device for driving a recording medium, such as a CD-R, is not required in the machine body, the system is relatively inexpensive and can satisfactorily operate even in severe environments with superior reliability.

While, in the above-described embodiment, the position and posture of the excavator-base coordinate system on the basis of the global coordinate system are determined using the two GPS antennas 531, 532 and the inclination sensor 524 for detecting the inclination angle of the upper swing structure 3, three GPS antennas may be installed at three places away from the center of swing of the upper swing structure 3 without providing the inclination sensor. In such a case, the position and posture of the excavator-base coordinate system on the basis of the global coordinate system can also be determined from position information of the three GPS antennas in a similar way.

When the system is dedicated for the case in which the operator rides on the hydraulic excavator 1A and manually performs the control operation, the joystick 72 and the wireless communication device 74 serving as remote control means can be dispensed with.

A method of specifying the position and direction of the hydraulic excavator on the basis of the known external coordinate system without directly utilizing the GPS will be described below as a third embodiment of the present invention with reference to FIGS. 21 to 27. In the drawings, identical members to those shown in FIGS. 1 and 17 are denoted by the same reference numerals.

Figure 21:
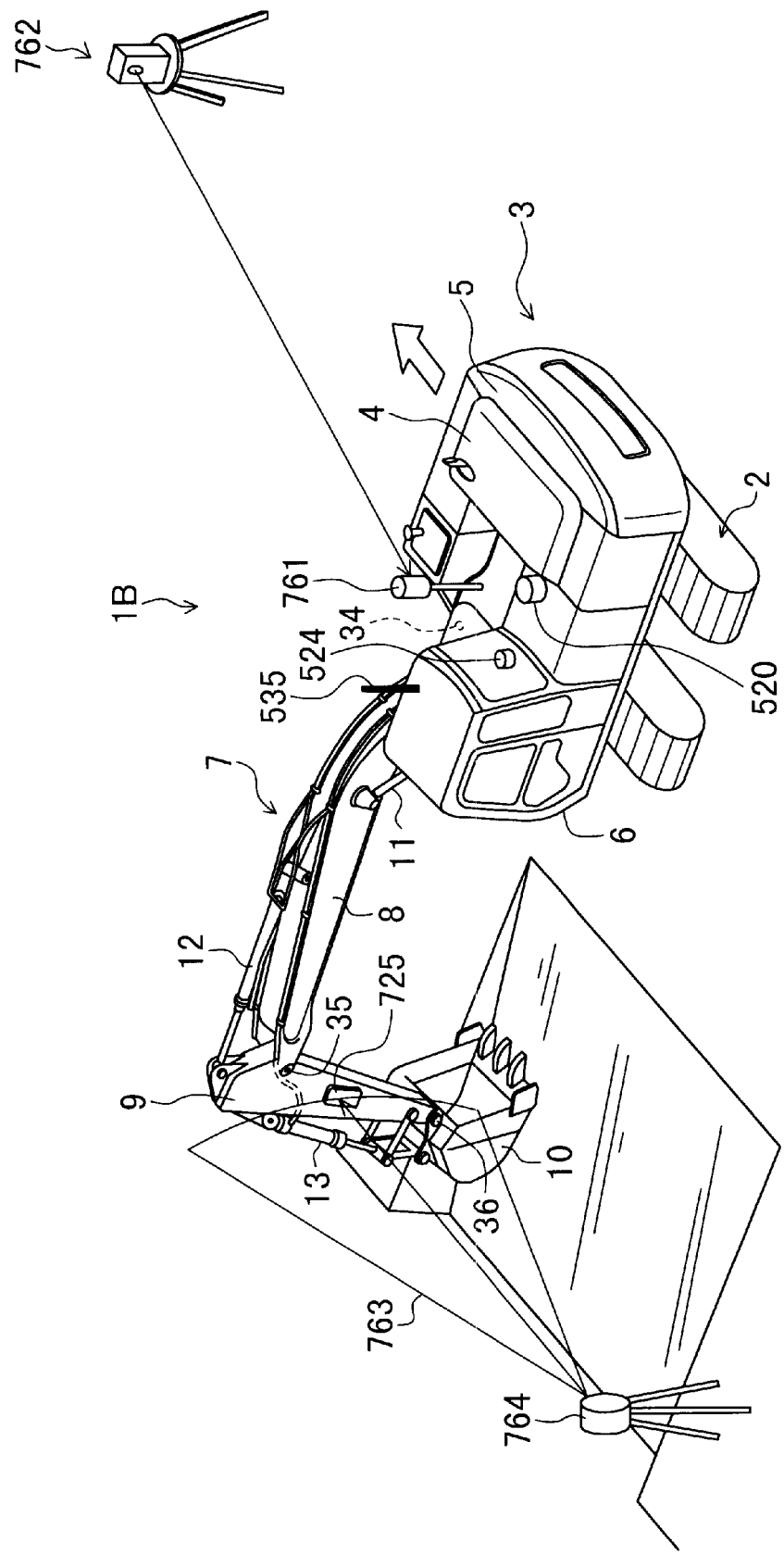
FIG. 21 shows an external appearance of a hydraulic excavator according to a third embodiment of the present invention, including working situations and devices in surroundings thereof.

FIG. 21 shows an external appearance of a hydraulic excavator according to this embodiment. A laser beam reflector 761 is provided in an upper portion of the upper swing structure 3 of a hydraulic excavator 1B, and a laser beam receiver 725 is provided on a lateral surface of the arm 9 of the front working device 7. The reflector 761 is attached to an upper end of a post erected at a position near a swing axis as the center of swing of the upper swing structure 3. As to antennas, only one radio antenna 535 is provided for transmitting signals from the various sensors 34 to 36, 520 and 524 and a signal from the laser beam receiver 725 to the management office 100, and receiving various data, such as wireless maneuvering signals, setting information of the target excavation plane and display information (described later), from the management office 100.

Outside the hydraulic excavator 1B, there are installed a laser tracking device 762 for tracking the position of the reflector 761 in real time and measuring the distance and azimuth of the reflector 761, and a laser beam stand 764 for emitting a laser beam wave front 763 toward the laser beam receiver 725. The laser tracking device 762 and the laser beam stand 764 are both installed on the ground. A combination of the reflector 761 and the laser tracking device 762 are known as an automatic tracking total station system. Additionally, a world coordinate system is set at a position where the laser tracking device 762 is installed.

Here, the position where the laser tracking device 762 is installed is measured and determined as three-dimensional data of the latitude, longitude and height beforehand. Accordingly, the positional relationship between the position of the laser tracking device 762 and the global coordinate system described above becomes known. Hence, the positional relationship between the world coordinate system set at the position of the laser tracking device 762 and the global coordinate system becomes also known.

Figure 22:
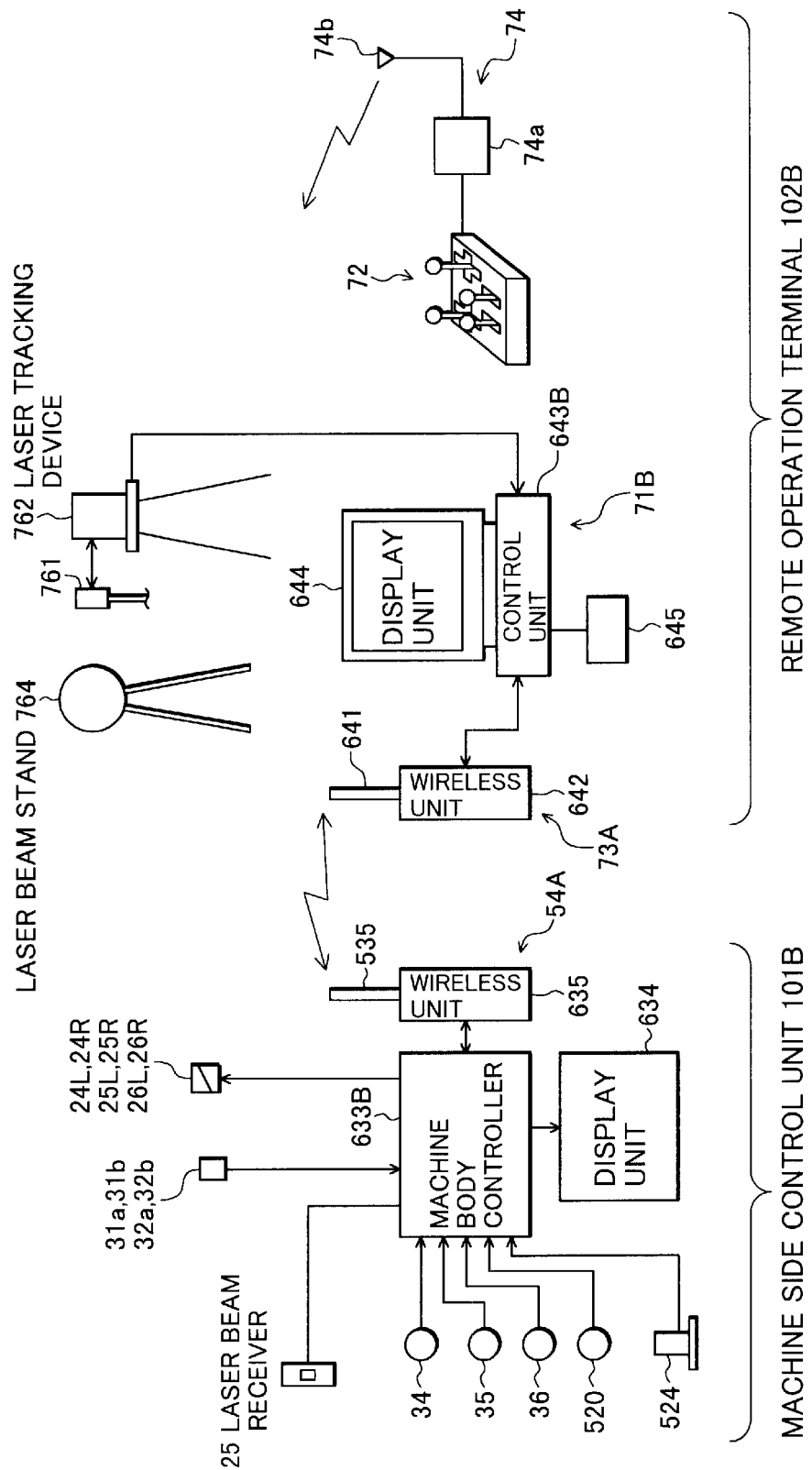
FIG. 22 shows an overall configuration of a remote control system and a remote setting system according to the third embodiment.

FIG. 22 shows an overall configuration of a remote control system and a remote setting system according to this embodiment.

A machine-side control unit 101B is essentially the same as that in the embodiment shown in FIG. 18 except for that a beam reception signal from the laser beam receiver 725 is further inputted to a machine body controller 633B and transmitted through the antenna 535 and the wireless unit 635, and that the GPS reception system shown in FIG. 18 is not included.

A remote control terminal 102B is essentially the same as that in the embodiment shown in FIG. 18 except for that the beam reception signal from the laser beam receiver 725, which has been transmitted from the machine-side control unit 101B, is received through the antenna 641 and the wireless unit 642, and then inputted to a control unit 643B of a personal computer 71B, and that without employing the GPS reception system shown in FIG. 18, the position signal from the reflector 761 provided on the hydraulic excavator 1B tracked by the laser tracking device 762 is inputted wirelessly or through wire to the control unit 643B of the personal computer 71B.

Figure 23:
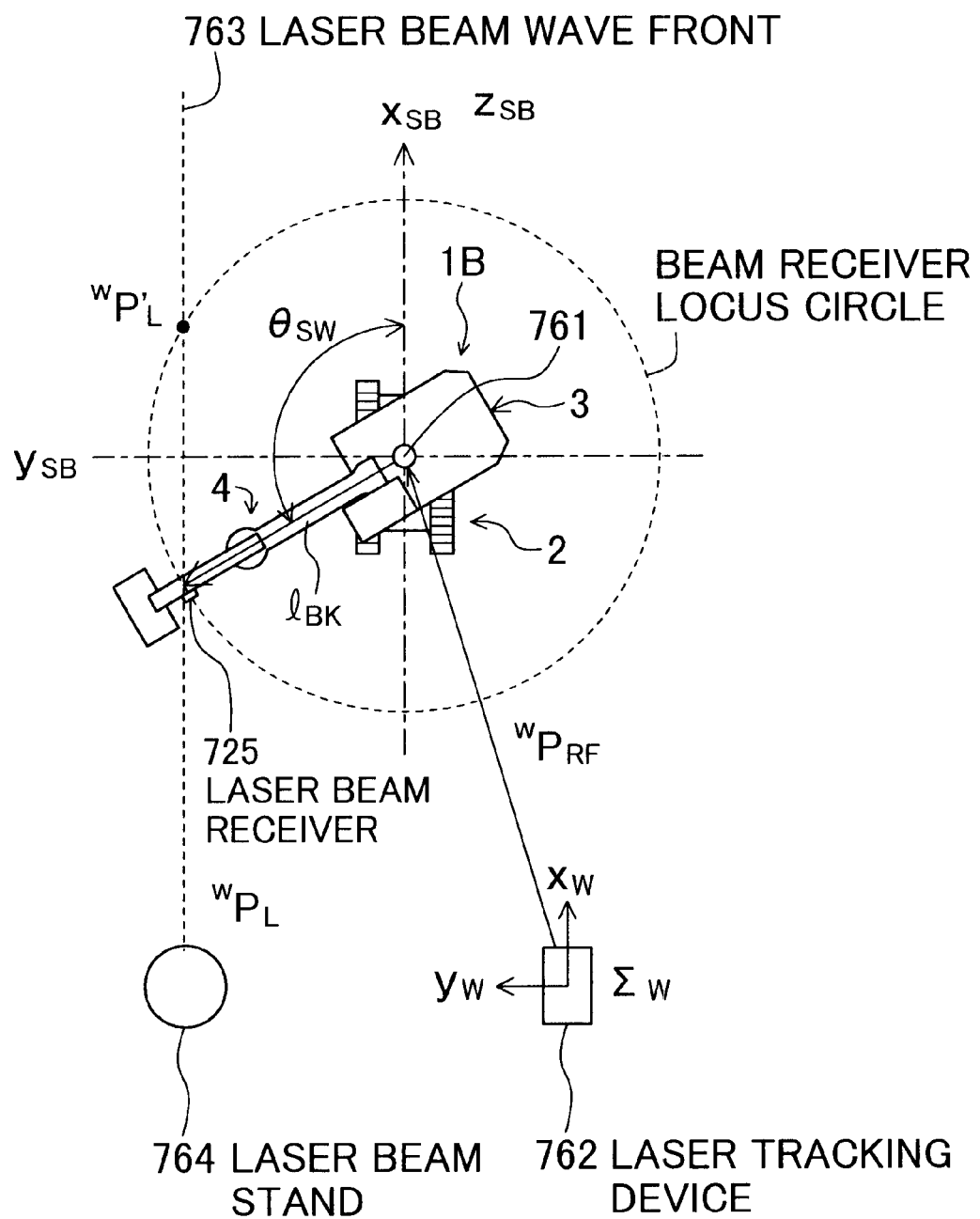
FIG. 23 shows a geometrical relationship among various members for explaining the principle of measurement in the third embodiment.
Figure 24:
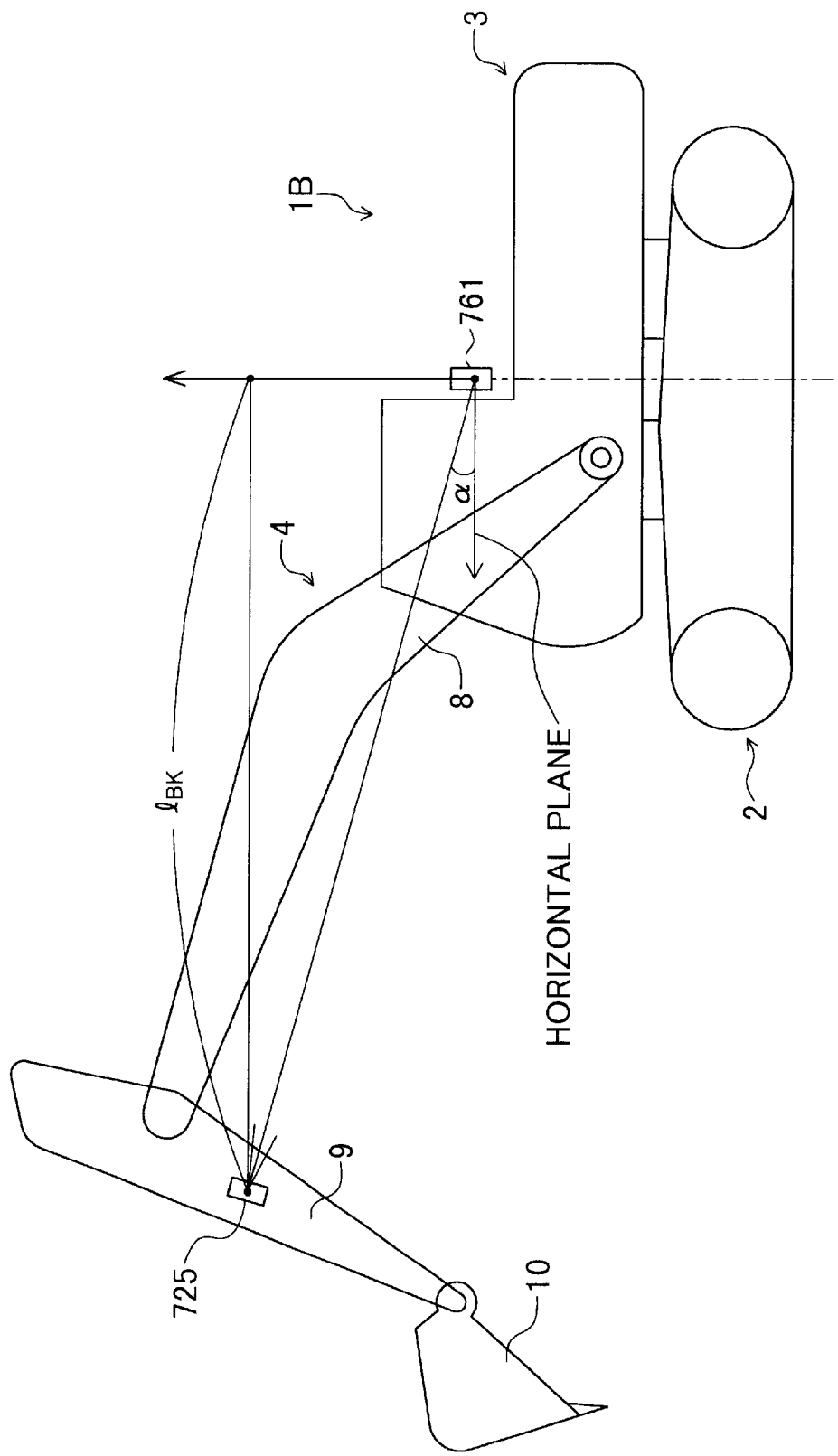
FIG. 24 shows another geometrical relationship among various members for explaining the principle of measurement in the third embodiment.

Details of a method for identifying the position and direction (posture) of the lower travel structure 2 relative to the position (world coordinate system), at which the laser tracking device 762 is installed, will be described with reference to FIGS. 23 and 24.

In the slope face excavation shown in FIG. 21, the hydraulic excavator can be located such that the laser beam receiver 725 intersects the laser beam wave front 763 emitted from the laser beam stand 764 at an appropriate position of the front working device 7 carrying out the excavation. On the side of the machine-side control unit 101B, the signals from the various angle sensors 34 to 36 and 520, the signal from the inclination meter 524 and the signal from the laser beam receiver 725 are taken into the machine body controller 633B, following which all the input data is transmitted to the side of the remote control terminal 102B. The control unit 643B of the remote control terminal 102B receives the transmitted data. When the front working device 7 is moved with operation by the operator and the laser beam receiver 725 receives the laser beam wave front 763 emitted from the laser beam stand 764, this serves as a trigger instructing the control unit 643B in the remote control terminal 102B to start computation to specify the position and direction of the lower travel structure 2 using the data received at that time.

Assuming that the hydraulic excavator 1B is in a horizontal position, a horizontal distance (length projected to a horizontal plane) $I_{BK}$ up to the laser beam receiver 725 and an angle α of elevation relative to the horizontal plane are determined from readout values of the boom angle meter 34 and the arm angle meter 35, which are included in the received data, with the reflector 761 being a reference point. In practice, however, the hydraulic excavator 1B is slightly inclined relative to the horizontal plane in many cases. Therefore, the readout values are corrected using the signal from the inclination meter 524 to determine the horizontal distance $I_{BK}$ up to the laser beam receiver 725 and the angle α of elevation with the reflector 761 being a reference point.

In view of that the positional relationship between the position, at which the laser tracking device 762 is installed, and the global coordinate system is known and the position and direction of the global coordinate system are also known, a world coordinate system $\Sigma_W$ is set as an expedient index at the installation position of the laser tracking device 762 as described above. The position of the reflector 761 is known as a result of the measurement made by the laser tracking device 762. The position of the reflector 761 is expressed by $^{W}P_{rf}$ on the basis of the world coordinate system. Here, "P" represents a position vector, a left-side superscript "W" represents the world coordinate system, and a right-side subscript "rf" represents the reflector.

Using $I_{BK}$, α and $^{W}P_{rf}$, a region in the horizontal plane where the laser beam receiver 725 is able to take its position can be expressed by an equation of a circle on the basis of the world coordinate system. It is here assumed that circle is called a beam receiver locus circle.

On the other hand, the positional relationship between the laser beam wave front 763 and the laser tracking device 762 can be set and known beforehand, and it can be expressed by an equation of a plane. For example, assuming that the hydraulic excavator 1B is in a horizontal position, when the laser beam wave front 763 is set to extend in the vertical direction, the laser beam wave front 763 can be expressed using the distance ($y_W$-coordinate value of the world coordinate system) between the laser tracking device 762 and the laser beam stand 764. A general method for identifying the positional relationship between the laser beam wave front 763 and the laser tracking device 762 will be described later.

From equations of the beam receiver locus circle and the laser beam wave front, two intersects $^{W}P_L$ and $^{W}P_L'$ between them are determined. The working situation of the hydraulic excavator 1B can be confirmed from a work progress plan or a monitoring camera, and the position of the laser beam receiver 725 can be specified by selecting one of $^{W}P_L$ and $^{W}P_L'$, i.e., $^{W}P_L$, depending on the working situation.

Here, the position $^{W}P_{rf}$ of the reflector 761 corresponds to the position of the upper swing structure 3 on the basis of the world coordinate system, and the position $^{W}P_L$ of the laser beam receiver 725 corresponds to the direction of the upper swing structure 3 on the basis of the world coordinate system. In other words, the position and direction of the upper swing structure 3 on the basis of the world coordinate system can be specified from $^{W}P_{rf}$ and $^{W}P_L$.

Once the position and direction of the upper swing structure 3 on the basis of the world coordinate system can be specified as described above, the position and direction of the lower travel structure 2 on the basis of the world coordinate system can be specified from a value $\theta_{SW}$ of the swing angle detected by the angle sensor 520 and values of the pitch angle and the roll angle detected by the inclination sensor 524. Further, it is possible to specify the excavator-base coordinate system $^{W}\Sigma_{SB}$ that is fixedly set to the lower travel structure 2 of the hydraulic excavator 1B and is a coordinate system as a base for expressing the operation of the hydraulic excavator 1B.

Once the excavator-base coordinate system is specified, there is no necessity of computing the excavator-base coordinate system again unless the hydraulic excavator travels or the lower travel structure 2 causes a shift in position. In the slope face excavation shown in FIG. 21, as described above, when the fore end of the bucket 10 can no longer reach the position, at which excavation is to be performed, with the swing of the upper swing structure 3, the hydraulic excavator 1B is operated for travel to move to another place. Each time the hydraulic excavator is moved in such a situation, the operator moves the front working device 7 again and the above-described computation is started upon a trigger given by the beam reception signal from the laser beam receiver 725 so that the excavator-base coordinate system $^{W}\Sigma_{SB}$ is specified.

Through the computation executed in such a way, the excavator-base coordinate system $^{W}\Sigma_{SB}$ can be always determined on the basis of the world coordinate system in spite of change in position of the hydraulic excavator 1B.

Since the positional relationship between the installation position of the laser tracking device 762, at which the world coordinate system $\Sigma_W$ is set, and the global coordinate system is known, the excavator-base coordinate system $^{G}\Sigma_{SB}$ on the basis of the world coordinate system can be easily converted into values $^{G}\Sigma_{SB}$ on the global coordinate system. By employing the excavator-base coordinate system $^{G}\Sigma_{SB}$ on the basis of the global coordinate system $\Sigma_G$, it becomes possible to utilize the working data that has been three-dimensionally processed using information of the latitude, longitude and altitude with respect to the globe.

Figure 25:
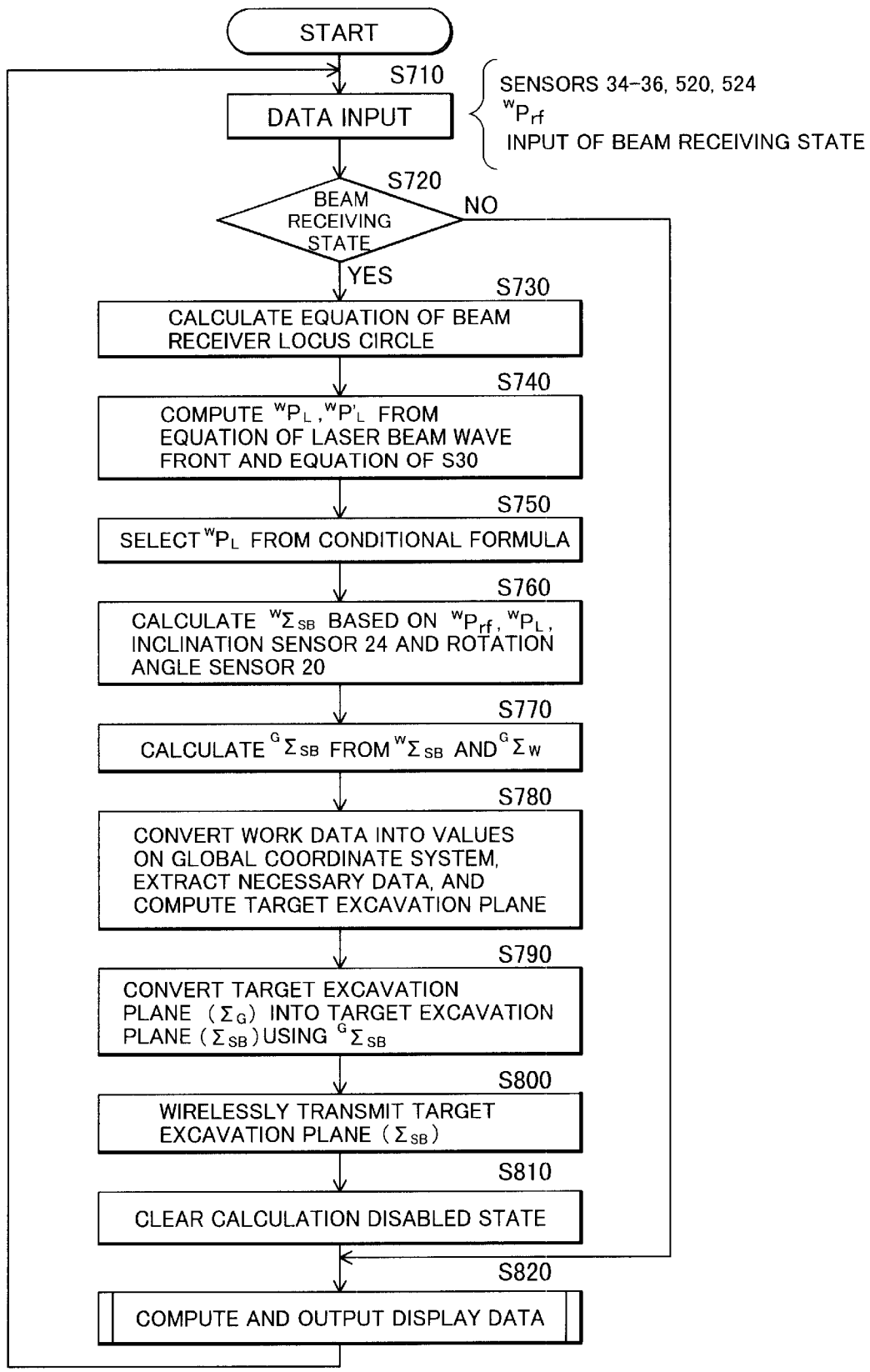
FIG. 25 is a flowchart showing processing procedures.
Figure 26:
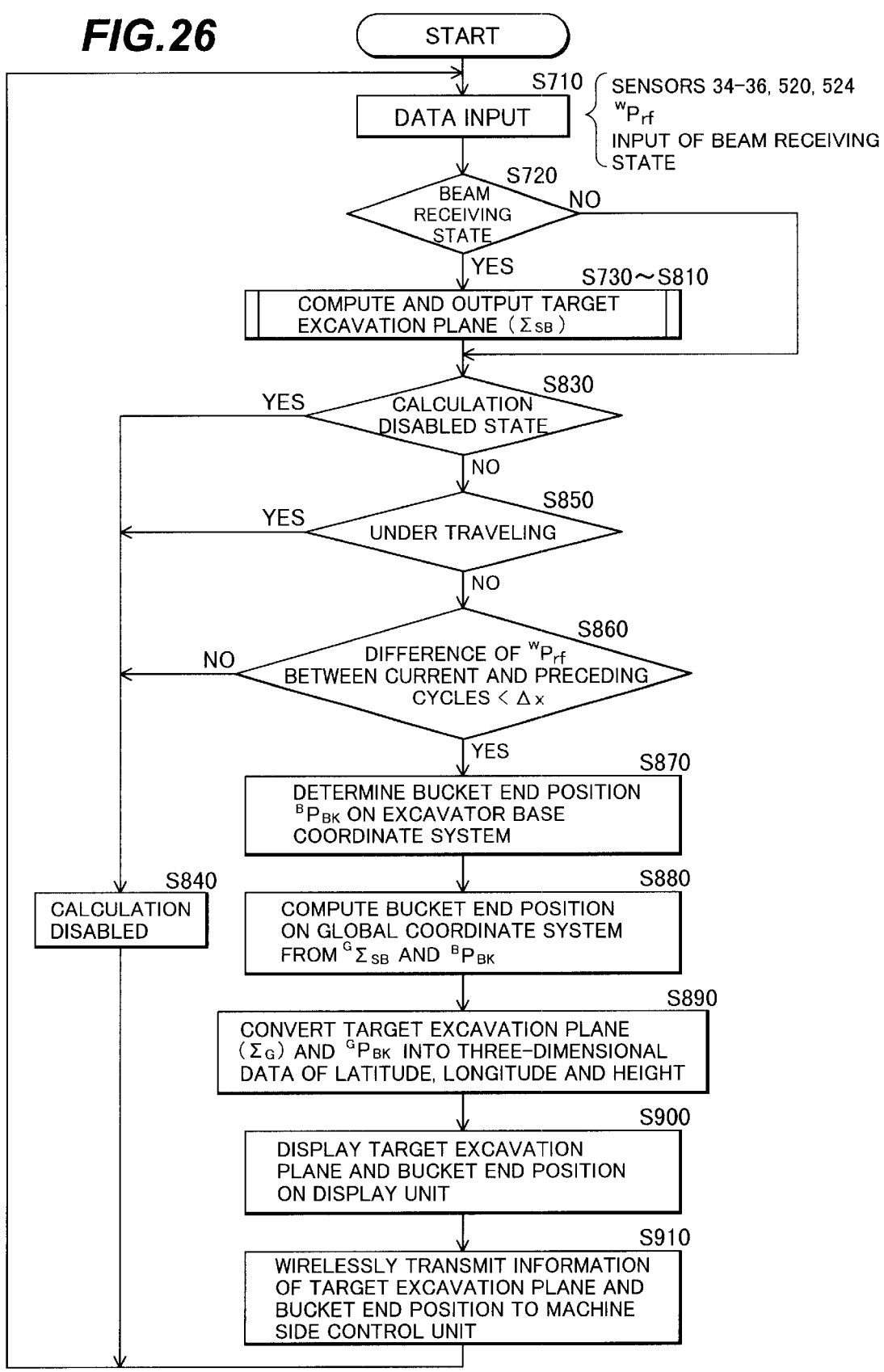
FIG. 26 is a flowchart showing processing procedures.

FIGS. 25 and 26 are flowcharts showing one example of processing procedures executed in the control unit 643B of the remote control terminal 102B.

Referring to FIG. 25, the controller first receives values from the various angle sensors 34 to 36, 520 and the inclination sensor 524, a signal indicating whether the laser beam receiver 725 is in the beam receiving state, and the position $^{W}P_{rf}$ of the reflector 761 (step S710). The values from the various angle sensors 34 to 36, 520 and the inclination sensor 524 and the signal indicating whether the laser beam receiver 725 is in the beam receiving state, are inputted from the machine-side control unit 101B through the antenna 641 and the wireless unit 642. The position $^{W}P_{rf}$ of the reflector 761 is inputted from the laser tracking device 762.

Then, it is determined whether the laser beam receiver 725 is in the beam receiving state (step S720). If the laser beam receiver 725 is in the beam receiving state, the process flow advances to step S730, and if it is not in the beam receiving state, the process flow skips to step S767. In step S730, the equation of the beam receiver locus circle is determined (step S730). More specifically, the horizontal distance $I_{BK}$ from the reflector 761 to the laser beam receiver 725 and the inclination α from the horizontal plane are first determined, as described above, based on the boom angle and the arm angle from the angle sensors 34, 35 and the pitch angle and the roll angle from the inclination sensor 524. The equation of the beam receiver locus circle parallel to the horizontal plane is next determined from the computed values $I_{BK}$, α and the position $^{W}P_{rf}$ of the reflector 761.

Then, from the equation of the laser beam wave front, which has been set beforehand, and the equation of the beam receiver locus circle determined in step S730, the two intersects $^{W}P_L$ and $^{W}P_L'$ between them are determined (step S740). Subsequently, $^{W}P_L$ is selected as the position of the laser beam receiver 725 depending on the condition of the work site (side nearer to the laser tracking device 762 in this example) (step S750).

The position and direction of the upper swing structure 3 on the basis of the world coordinate system is specified from the thus-determined $^{W}P_{rf}$ and $^{W}P_L$, and the values $^{W}\Sigma_{SB}$ (position and direction) of the excavator-base coordinate system $\Sigma_{SB}$ on the basis of the world coordinate system are determined using values of the swing angle from the angle sensor 520 and the pitch angle and the roll angle from the inclination sensor 524 (step S760).

Then, the world coordinate system values $^{G}\Sigma_W$ on the basis of the global coordinate system stored in the memory of the control unit 643B are read out, and the position and posture (direction of the lower travel structure 2) of the excavator-base coordinate system $\Sigma_{SB}$ are determined as values $^{G}\Sigma_{SB}$ on the global coordinate system from the excavator-base coordinate system values $^{W}\Sigma_{SB}$ on the basis of the world coordinate system, which has been determined in step S760, and the read-out world coordinate system $^{G}\Sigma_W$ on the basis of the global coordinate system (step S770).

Then, the processing is executed in a similar manner to that in steps S540, S550 and S560 shown in FIG. 20. More specifically, the working data having been processed using the information of the latitude, longitude and altitude and stored in the memory of the control unit 643B is read out, converted into data on the global coordinate system $\Sigma_G$, and compared with the excavator-base coordinate system $^{G}\Sigma_{SB}$ on the basis of the global coordinate system to extract a part of the working data as two-dimensional data with respect to the position and direction of the excavator-base coordinate system $^{G}\Sigma_{SB}$, following which the target excavation plane ($\Sigma_G$) is computed from the extracted part of the working data (step S780). Thereafter, the target excavation plane ($\Sigma_G$) is converted into values on the excavator-base coordinate system $\Sigma_{SB}$ using the coordinate data of the excavator-base coordinate system $^{G}\Sigma_{SB}$ (step S790). The target excavation plane ($\Sigma_{SB}$) converted into the values on the excavator-base coordinate system $\Sigma_{SB}$ is transmitted to the machine-side control unit 101B through the antenna 641 and the wireless unit 642 (step S800). The machine-side control unit 101B stores the transmitted setting information in the control unit 643B for use in control of the front working device 7.

Then, if the calculation disabled state is set, it is cleared (step S810), followed by proceeding to step S820. In step S820, a process for computing and outputting display data is executed as shown in FIG. 26.

Referring to FIG. 26, it is first determined whether the system is in the calculation disabled state (step S830). If the system is in the calculation disabled state, the process flow skips to step S840. If not in the calculation disabled state, it is then determined whether the operator is operating the hydraulic excavator to travel (step S850). If the hydraulic excavator is under traveling, the process flow skips to step S840. In step S840, a message indicating the calculation disabled state is displayed on the display unit 644, followed by returning to step S710.

If it is determined in step S850 that the hydraulic excavator is not under traveling, the process flow advances to step S860. In step S860, it is determined whether the center of swing of the hydraulic excavator 1B has shifted in excess of a certain value. To that end, the previous position and the current position of the reflector 761 are compared with each other. If a difference between the two positions is not smaller than ΔX, the process flow skips to step S840. If the difference is smaller than ΔX, the process flow advances to steps S870 to S910.

The processing in steps S870 to S910 is essentially the same as that in steps S570 to S610 shown in FIG. 20. More specifically, a bucket end position $^{B}P_{BK}$ on the excavator-base coordinate system $\Sigma_B$ is determined from the boom angle, the arm angle and the bucket angle detected by the angle sensors 34 to 36, the swing angle detected by the swing angle sensor 520, the positional relationship between the origin of the excavator-base coordinate system $\Sigma_{SB}$ and the base end of the boom 8, as well as the dimensions of the boom 8, the arm 9 and the bucket 10, which are stored in the memory (step S870). Thereafter, a bucket end position $^{G}P_{BK}$ on the global coordinate system $\Sigma_G$ is determined from the excavator-base coordinate system values $^{G}\Sigma_{SB}$ on the basis of the global coordinate system $\Sigma_G$ determined in step S770 and the bucket end position $^{B}P_{BK}$ on the excavator-base coordinate system determined in step S870 (step S880). Subsequently, the target excavation plane ($\Sigma_G$) on the global coordinate system determined in step S780 and the bucket end position $^{G}P_{BK}$ on the global coordinate system determined in step S880 are converted into three-dimensional data of the latitude, longitude and height (step S890).

Then, the target excavation plane and the bucket end position both converted into three-dimensional data of the latitude, longitude and height are displayed on the display unit 644B (step S900). Further, the information of the target excavation plane and the bucket end position is transmitted to the machine-side control unit 101B through the antenna 641 and the wireless unit 642 (step S910). In the machine-side control unit 101B, the transmitted information is displayed on the display unit 634 through the control unit 643B. On this occasion, topography data, which is included in the part of the working data extracted in step S780 as the two-dimensional data with respect to the position and direction of the excavator-base coordinate system $^{G}\Sigma_{SB}$, may also be converted into three-dimensional data of the latitude, longitude and height, and displayed on the display units 644, 634.

After the completion of the foregoing processing, the process flow returns to step S710 and repeats the processing described above.

Figure 27:
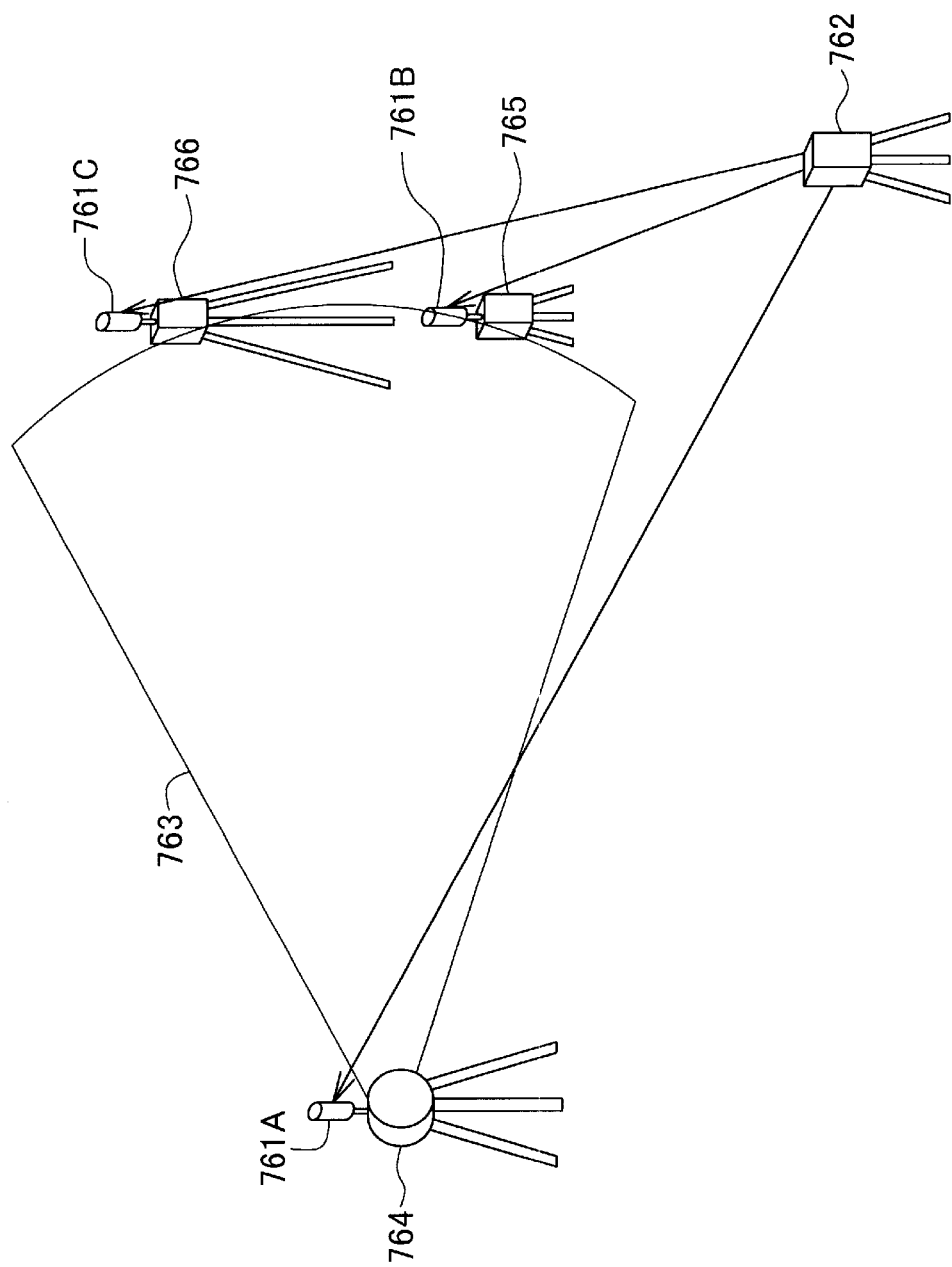
FIG. 27 shows one example of a method and an apparatus for identifying a positional relationship between a wave front of a laser beam outputted from a laser beam stand and a laser tracking device (equation of the laser beam wave front on a world coordinate system).

One example of a method and apparatus for identifying the positional relationship between the laser beam wave front 763 emitted from the laser beam stand 764 and the laser tracking device 762 (i.e., the equation of the laser beam wave front 763 on the basis of the world coordinate system) will be described below with reference to FIG. 27.

Mounted to the laser beam stand 764 is a reflector 761A as a representative point for specifying the position of the laser beam stand 764. Here, the positional relationship between the position of the reflector 761A and the emission center of the laser beam stand 764 is known from the dimensions of a mounting member for the reflector 761A, etc. On the other hand, two ground-installed laser beam receivers 765, 766 are prepared. A reflector 761B is mounted to the laser beam receiver 765, and a reflector 761C is mounted to the laser beam receiver 766. The positional relationship between a beam receiving portion of the laser beam receiver 765 and the reflector 761B and the positional relationship between a beam receiving portion of the laser beam receiver 766 and the reflector 761C are known from the dimensions of mounting members for the reflectors 761B, 761C, etc.

The laser beam receiver 765 and the laser beam receiver 766 are installed in positions where they can receive the laser beam wave front 763 emitted from the laser beam stand 764. In that condition, respective positions of the reflector 761A, the reflector 761B and the reflector 761C are measured using the laser tracking device 762. The position of the emission center of the laser beam stand 764, the position of the beam receiving portion of the laser beam receiver 765, and the position of the beam receiving portion of the laser beam receiver 766 can be computed based on the measured three positions. Then, an equation of a plane containing the computed three positions can be determined. As a result, an equation of the laser beam wave front 763 emitted from the laser beam stand 764 can be identified.

While the two laser beam receivers 765, 766 are used in the above example, just a single laser beam receiver may be used. In such a case, respective positions of three points on the laser beam wave front 763 can be likewise measured by moving the single laser beam receiver from one to another place and measuring the position of a reflector in each of the places. Hence, the equation of the laser beam wave front 763 can be identified in a similar manner as described above.

With this embodiment thus constituted, as with the second embodiment, the remote setting of the target excavation plane and the remote maneuvering of the hydraulic excavator can be easily performed with an inexpensive system regardless of the position of the hydraulic excavator by utilizing the working data that has been three-dimensionally processed using the information of the latitude, longitude and altitude with respect to the globe.

Also, with this embodiment, the position and direction of the machine body (lower travel structure 2) of the hydraulic excavator 1B on the basis of the global coordinate system (i.e., the position and posture of the excavator-base coordinate system $^{G}\Sigma_{SB}$ on the basis of the global coordinate system) can be always computed without directly employing the GPS information. Therefore, even when the hydraulic excavator is in the work site such as the underground, the interior of buildings and mountain regions, where it is impossible to catch the GPS satellites, or even when the work site is under weather conditions where it is impossible to receive electric waves from the satellites with the GPS, the remote setting of the target excavation plane and the remote maneuvering of the hydraulic excavator can be performed without being affected by the conditions of the work site by utilizing the working data that has been three-dimensionally processed using the information of the latitude, longitude and altitude with respect to the globe.

Further, with this embodiment, when the system is dedicated for the case in which the operator rides on the hydraulic excavator 1B and manually performs the control operation, the joystick 72 and the wireless communication device 74 serving as remote control means can be similarly dispensed with.

While several embodiments of the present invention have been described above, the present invention is not limited to those embodiments, and various modifications and additions can be made without departing the scope of the spirit of the present invention. For example, while the above embodiments have been described in connection with the case of forming the target excavation plane, as a target work plane, by the hydraulic excavator 1, the present invention is also applicable to work of laying concrete blocks with a handling device mounted to the front working device 7 of the hydraulic excavator 1. In such a case, a concrete block laid plane is the target excavation plane.

INDUSTRIAL APPLICABILITY

According to the present invention, the operator can remotely set the target excavation plane while looking at the screen of display means, and can also remotely maneuver the front working device, whereby a target work plane can be formed by utilizing the control function of front control means. Hence, the remote setting of the target excavation plane and the remote maneuvering of a construction machine can be easily performed.

Also, since the front control means is operated in a semiautomatic control manner in which the operation of the front working device is controlled based on wireless maneuvering signals from remote control means and setting information from the operation device 71c, a burden imposed on the operator is much reduced in comparison with the case of manual control, and the system can be easily adapted for various work sites just by changing the setting information.

Further, according to the present invention, entry of the setting information of the target work plane on the side of the remote control terminal is performed by inputting data correlated to an external reference for the construction machine, and the setting information of the target work plane is converted into the positional relationship between the construction machine and the target work plane in one of machine-side control means and the remote control terminal. Therefore, the operator can set the target work plane by employing the external reference. In addition, since the positional relationship among the external reference, the target work plane and the construction machine is displayed on the display means of the remote control terminal at the time of setting, the operator can easily set the target work plane while looking at the screen of the display means.

Moreover, according to the present invention, even though working data correlated to an external coordinate system is given as a very large amount of electronic data, means for setting the setting information of the target work plane on the basis of a machine body coordinate system, which is set on the construction machine, using the working data and means for converting the setting information are both provided in the remote control terminal. Even with the working data being a very large amount of electronic data, therefore, it is no longer necessary to store the working data in the machine-side control means, whereas the operator can easily perform the remote setting of the target work plane by utilizing the working data in the form of a very large amount of electronic data, and also can easily the remote maneuvering of the construction machine by employing the setting information. Additionally, since a device for driving a recording medium, such as a CD-R, is not required in the machine body of the construction machine, the system is relatively inexpensive and can satisfactorily operate even in severe environments with superior reliability.

Furthermore, according to the present invention, regardless of movement of the construction machine, it is possible to specify the position and posture of the construction machine with respect to the external coordinate system, and to create the setting information of the target work plane on the basis of the machine body coordinate system.

Still further, according to the present invention, the position and posture of the machine body coordinate system can be determined as values on the external coordinate system (global coordinate system) without directly employing the GPS. Therefore, even when the construction machine is in the work site such as the underground, the interior of buildings and mountain regions, where it is impossible to catch GPS satellites, or even when the work site is under weather conditions where it is impossible to receive electric waves from the satellites with the GPS, the position and posture of the machine body coordinate system can be determined as values on the external coordinate system (global coordinate system) without being affected by the conditions of the work site.

What is claimed is:

1. A remote control system for a construction machine comprising a plurality of driven members including a plurality of vertically rotatable front members which constitute a multi-articulated front working device, a plurality of hydraulic actuators for driving respectively said plurality of driven members, a plurality of hydraulic control valves for controlling flow rates of a hydraulic fluid supplied to said plurality of hydraulic actuators, and front control means for controlling said plurality of hydraulic control valves and controlling operation of said front working device so as to form a preset target work plane, wherein:

the system includes machine-side control means equipped in said construction machine and a remote control terminal for wirelessly maneuvering said construction machine, said remote control terminal comprises remote control means for outputting wireless maneuvering signals to instruct operations of said plurality of driven members, input means for inputting setting information of the target work plane, first wireless communicating means for transmitting the wireless maneuvering signals and the setting information to said construction machine, and display means for displaying a positional relationship between said construction machine and the target work plane, said machine-side control means includes second wireless communicating means for receiving the wireless maneuvering signals and the setting information from said remote control terminal, and said front control means controls said hydraulic control valves based on the wireless maneuvering signals and the setting information, thereby controlling the operation of said front working device so as to form the target work plane.

2. A remote control system for a construction machine according to claim 1, wherein:

said input means of said remote control terminal is means for inputting the setting information correlated to an external reference for said construction machine, and said display means is means for displaying the positional relationship between said construction machine and the target work plane in correlation to the external reference, one of said machine-side control means and said remote control terminal further includes setting information converting means for converting the setting information of the target work plane correlated to the external reference for said construction machine into the positional relationship between said construction machine and the target work plane, and said front control means controls said hydraulic control valves based on the wireless maneuvering signals and the setting information converted into the positional relationship between said construction machine and the target work plane, thereby controlling the operation of said front working device so as to form the target work plane.

3. A remote control system for a construction machine according to claim 2, wherein:

the external reference (R) is a laser reference plane formed by a laser beam emitted from a laser beam stand, said input means is means for inputting, as the setting information, a positional relationship between the laser reference plane and the target work plane, and said setting information converting means comprises measuring means for measuring a positional relationship between said construction machine and the laser reference plane, and computing means for determining the positional relationship between said construction machine and the target work plane by using the positional relationship between the laser reference plane and the target work plane inputted through said input means and the positional relationship between said construction machine and the laser reference plane measured by said measuring means.

4. A remote control system for a construction machine according to claim 2, wherein:

said display means of said remote control terminal operates in a switchable manner between a setting mode and a remote control mode, displays a positional relationship among the external reference (R), the target work plane and said construction machine when the setting mode is selected, and displays a positional relationship between the target work plane and said front working device when the remote control mode is selected.

5. A remote control system for a construction machine according to claim 2, wherein:

the external reference ($\Sigma_G$) is an external coordinate system set outside said construction machine and having a known position and posture, said input means is means for inputting, as the setting information, working data correlated to the external coordinate system, and said setting information converting means is means provided in said remote control terminal, creating setting information of the target work plane on the basis of the external coordinate system from the working data, and converting the created setting information into the setting information of the target work plane on the basis of a machine body coordinate system ($\Sigma_{SB}$) set on said construction machine.

6. A remote control system for a construction machine according to claim 5, wherein:

the external coordinate system ($\Sigma_G$) is an orthogonal coordinate system having the origin set to the center of an ellipsoid representing the globe.

7. A remote control system for a construction machine according to claim 5, wherein:

said setting information converting means comprises machine-body coordinate measuring and computing means for determining the position and posture of the machine body coordinate system ($\Sigma_{SB}$) as values on the external coordinate system ($\Sigma_G$), and setting information computing means for converting the setting information of the target work plane on the basis of the external coordinate system into the setting information of the target work plane on the basis of the machine body coordinate system by using the position and posture of the machine body coordinate system on the basis of the external coordinate system determined by said machine-body coordinate measuring and computing means.

8. A remote control system for a construction machine according to claim 7, wherein:

said setting information converting means further comprises means for comparing the position and posture of the machine body coordinate system ($\Sigma_{SB}$) on the basis of the external coordinate system ($\Sigma_G$) with the working data, extracting a part of the working data with respect to the position and posture of the machine body coordinate system, and creating the setting information of the target work plane on the basis of the external coordinate system from the part of the working data.

9. A remote control system for a construction machine according to claim 7,
wherein said machine-body coordinate measuring and computing means comprises:
at least two GPS receiving means installed on said construction machine at different positions, and coordinate position computing means for determining the position and posture of the machine body coordinate system ($\Sigma_{SB}$), as values on the external coordinate system ($\Sigma_G$), based on information received by said two GPS receiving means.

10. A remote control system for a construction machine according to claim 9, wherein:
said machine-body coordinate measuring and computing means further comprises inclination measuring means for measuring an inclination of said construction machine, and
said coordinate position computing means determines the position and posture of the machine body coordinate system ($\Sigma_{SB}$), as values on the external coordinate system ($\Sigma_G$), based on information received by said two GPS receiving means and a result measured by said inclination measuring means.

11. A remote control system for a construction machine according to claim 9, wherein:
said construction machine comprises a lower travel structure and an upper swing structure mounted on said lower travel structure in a swingable manner with said front working device being mounted to said upper swing structure in a vertically rotatable manner,
said two GPS receiving means have two GPS antennas installed on said upper swing structure at different positions,
the machine body coordinate system ($\Sigma_{SB}$) is an orthogonal coordinate system fixedly set on said lower travel structure at a position near a rotation axis of said upper swing structure,
said machine-body coordinate measuring and computing means further comprises angle measuring means for measuring a rotational angle of said upper swing structure relative to said lower travel structure, and
said coordinate position computing means determines the position and posture of the machine body coordinate system, as values on the external coordinate system ($\Sigma_G$), based on the information received by said two GPS receiving means and a result measured by said angle measuring means.

12. A remote control system for a construction machine according to claim 7,
wherein said machine-body coordinate measuring and computing means comprises:
three-dimensional position measuring means installed at a particular position on a ground, which has a known positional relationship relative to the external coordinate system ($\Sigma_G$), and measuring a distance and azimuth of the particular position on the ground relative to a particular position on said construction machine,
a laser beam receiver installed on said construction machine,
a laser beam stand for emitting a laser beam toward said laser beam receiver, and
coordinate position computing means for computing a positional relationship between the particular position on the ground and the laser beam upon a trigger issued when said laser beam receiver receives the laser beam emitted from said laser beam stand, and determining the position and posture of the machine body coordinate system ($\bullet_{SB}$) with respect to the particular position on the ground based on a thus-computed result and a result measured by said three-dimensional position measuring means.

13. A remote control system for a construction machine according to claim 12, wherein:
said machine-body coordinate measuring and computing means further comprises inclination measuring means for measuring an inclination of said construction machine, and said coordinate position computing means determines the position and posture of the machine body coordinate system ($\Sigma_{SB}$) with respect to the particular position on the ground based on the result of computing the positional relationship between the particular position on the ground, the laser beam and the result measured by said three-dimensional position measuring means, and a result measured by the inclination measuring means.

14. A remote control system for a construction machine according to claim 12, wherein:
said construction machine comprises a lower travel structure and an upper swing structure mounted on said lower travel structure in a swingable manner with said front working device being mounted to said upper swing structure in a vertically rotatable manner,
the particular position of said construction machine, at which the machine body coordinate system ($\Sigma_{SB}$) is set, is located near a rotation axis of said upper swing structure,
the machine body coordinate system ($\Sigma_{SB}$) is an orthogonal coordinate system fixedly set on said lower travel structure, said machine-body coordinate measuring and computing means further comprises angle measuring means for measuring a rotational angle of said upper swing structure relative to said lower travel structure, and
said coordinate position computing means determines the position and posture of the machine body coordinate system ($\Sigma_{SB}$) with respect to the particular position on the ground based on the result of computing the positional relationship between the particular position on the ground and the laser beam, the result measured by said three-dimensional position measuring means, and a result measured by said angle measuring means.

15. A remote control system for a construction machine according to claim 14, wherein:
said laser beam receiver is provided on said front working device,
said machine-body coordinate measuring and computing means further comprises position/posture measuring means for measuring positions and postures of said plurality of front members constituting said front working device, and
said coordinate position computing means determines the position and posture of the machine body coordinate system ($\Sigma_{SB}$) with respect to the particular position on the ground based on the result of computing the positional relationship between the particular position on the ground and the laser beam, the result measured by said three-dimensional position measuring means, the result measured by said angle measuring means, and a result measured by said position/posture measuring means.

16. A remote control system for a construction machine according to claim 12, wherein:

said three-dimensional position measuring means is a laser tracking device for tracking a reflector installed at the particular position of said construction machine and measuring a distance to and azimuth of said reflector.

17. A remote setting system for a construction machine comprising a plurality of driven members including a plurality of vertically rotatable front members which constitute a multi-articulated front working device, a plurality of hydraulic actuators for driving respectively said plurality of driven members, a plurality of hydraulic control valves for controlling flow rates of a hydraulic fluid supplied to said plurality of hydraulic actuators, and front control means for controlling said plurality of hydraulic control valves and controlling operation of said front working device so as to form a preset target work plane, wherein:

the system includes machine-side control means equipped in said construction machine and a remote control terminal, said remote control terminal comprises input means for inputting working data correlated to an external coordinate system that is set outside said construction machine and has a known position and posture; setting information converting means for creating setting information of the target work plane on the basis of the external coordinate system from the working data, and converting the created setting information into setting information of the target work plane on the basis of a machine body coordinate system ($\Sigma_{SB}$) set on said construction machine; first wireless communicating means for transmitting the setting information of the target work plane on the basis of the machine body coordinate system ($\Sigma_{SB}$) to said construction machine; and display means for displaying a positional relationship between said construction machine and the target work plane in correlation to the external coordinate system, said machine-side control means includes second wireless communicating means for receiving the setting information of the target work plane on the basis of the machine body coordinate system ($\Sigma_{SB}$) from said remote control terminal, and said front control means controls said hydraulic control valves based on the setting information of the target work plane on the basis of the machine body coordinate system ($\Sigma_{SB}$), thereby controlling the operation of said front working device so as to form the target work plane.

18. A remote setting system for a construction machine according to claim 17, wherein:

the external coordinate system ($\Sigma_G$) is an orthogonal coordinate system having the origin set to the center of an ellipsoid representing the globe.

19. A remote setting system for a construction machine according to claim 17, wherein:

said setting information converting means comprises machine-body coordinate measuring and computing means for determining a position and posture of the machine body coordinate system ($\Sigma_{SB}$) as values on the external coordinate system ($\Sigma_{SB}$), and setting information computing means for converting the setting information of the target work plane on the basis of the external coordinate system into the setting information of the target work plane on the basis of the machine body coordinate system by using the position and posture of the machine body coordinate system on the basis of the external coordinate system determined by said machine-body coordinate measuring and computing means.

20. A remote setting system for a construction machine according to claim 19, wherein:

said setting information converting means further comprises means for comparing the position and posture of the machine body coordinate system ($\Sigma_{SB}$) on the basis of the external coordinate system ($\Sigma_G$) with the working data, extracting a part of the working data with respect to the position and posture of the machine body coordinate system, and creating the setting information of the target work plane on the basis of the external coordinate system from the part of the working data.

* * * * *